United States Patent
Guo et al.

(10) Patent No.: US 12,267,699 B2
(45) Date of Patent: Apr. 1, 2025

(54) RELAY MODE CONFIGURATION METHOD AND APPARATUS, RELAY COMMUNICATION METHOD AND APPARATUS, AND DEVICE

(71) Applicant: GUANGDONG OPPO MOBILE TELECOMMUNICATIONS CORP., LTD., Dongguan (CN)

(72) Inventors: Yali Guo, Dongguan (CN); Fei Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/201,968

(22) Filed: May 25, 2023

(65) Prior Publication Data
US 2023/0300638 A1 Sep. 21, 2023

Related U.S. Application Data

(63) Continuation of application No. PCT/CN2021/084741, filed on Mar. 31, 2021.

(51) Int. Cl.
*H04W 24/02* (2009.01)
*H04W 40/22* (2009.01)
*H04W 88/04* (2009.01)

(52) U.S. Cl.
CPC .......... *H04W 24/02* (2013.01); *H04W 40/22* (2013.01); *H04W 88/04* (2013.01)

(58) Field of Classification Search
None
See application file for complete search history.

(56) References Cited

U.S. PATENT DOCUMENTS 10,588,031 B2  3/2020  Lee
10,588,124 B2  3/2020  Chen
(Continued)

FOREIGN PATENT DOCUMENTS

CN   101841865 A   9/2010
CN   110098858 A   8/2019
(Continued)

OTHER PUBLICATIONS

Author Unknown, Solution to mitigate privacy issues of relay service codes and PDU parameters for L3 UE-to-NW relays, pp. 1-6 , Jan. 18, 2021.*
(Continued)

*Primary Examiner* — Christopher M Crutchfield
(74) *Attorney, Agent, or Firm* — BAYES PLLC

(57) ABSTRACT

The present application relates to the technical field of communications, and provides a relay mode configuration method and apparatus, a relay communication method, and a device. The method comprises: a core network device sends a terminal device first configuration information, the first configuration information comprising at least one relay mode configured by the core network device for a terminal device. In embodiments of the present application, the core network device configures a relay mode for a terminal device having a Prose capability, such that the terminal device is clear about a connection mode of relay communication, thereby ensuring that the terminal device can implement relay communication.

20 Claims, 15 Drawing Sheets

(56) References Cited

U.S. PATENT DOCUMENTS

| | | | |
|---|---|---|---|
| 2017/0094656 | A1 | 3/2017 | Chen et al. |
| 2018/0054237 | A1 | 2/2018 | Tseng |
| 2018/0234862 | A1 | 8/2018 | Lee et al. |
| 2019/0350047 | A1 | 11/2019 | Shan et al. |
| 2021/0014737 | A1* | 1/2021 | Yang ................... H04W 76/11 |
| 2021/0203406 | A1* | 7/2021 | Tekgul ............. H04B 7/15557 |
| 2021/0250749 | A1* | 8/2021 | Cheng ............... H04W 12/0471 |
| 2021/0289391 | A1* | 9/2021 | Paladugu ........... H04L 47/2491 |
| 2021/0289392 | A1* | 9/2021 | Paladugu .......... H04W 28/0268 |
| 2022/0108870 | A1* | 4/2022 | Li ............................ G21K 7/00 |
| 2022/0109970 | A1* | 4/2022 | Jeong .................... H04W 72/02 |
| 2023/0199550 | A1* | 6/2023 | Xing ................. H04W 28/0215 370/329 |
| 2023/0232476 | A1* | 7/2023 | Wang .................... H04W 24/02 370/329 |
| 2023/0371111 | A1* | 11/2023 | Xu ........................ H04W 40/22 |

FOREIGN PATENT DOCUMENTS

| | | | |
|---|---|---|---|
| CN | 110099423 | A | 8/2019 |
| CN | 202011069824 | * | 9/2020 |
| EP | 4224907 | A1 | 8/2023 |
| EP | 4271043 | A1 | 11/2023 |
| WO | 2017026763 | A1 | 2/2017 |
| WO | 2020223629 | A1 | 11/2020 |
| WO | PCT/CN2021/076527 | * | 2/2021 |

OTHER PUBLICATIONS

TSG-RAN WG1 #56-bis R1-091439, ZTE, "Approach for Selecting Relay Operation Mode Based on User Traffic Types", Souel, Korea, Mar. 23-Mar. 27, 2009.

3GPP TSG-RAN WG2 Meeting #111-e R2-2007041, vivo, "Protocol stack and service continuity for L2 and L3 relay", E-Meeting, Aug. 17-Aug. 28, 2020.

International Search Report in the international application No. PCT/CN2021/084741, mailed on Jul. 29, 2021.

Written Opinion of the International Search Authority in the international application No. PCT/CN2021/084741, mailed on Jul. 29, 2021.

3GPP TR 23.752 V1.0.0 (Nov. 2020), 3rd Generation Partnership Project; Technical Specification Group Services and System Aspects; Study on system enhancement for Proximity based Services (ProSe) in the 5G System (5GS) (Release 17).

SA WG2 Meeting #143-E S2-2101630, OPPO, "KI#8, Update to Sol#35 for PDU session parameter related provisioning", Elbonia, Feb. 24-Mar. 9, 2021.

SA WG2 Meeting #121 S2-173410, Nokia, Alcatel-Lucent Shanghai Bell, ATT, "eRelay discovery option, from public safety's context", May 29-Jun. 2, 2017, Hangzhou, China.

3GPP TSG-WG SA2 Meeting #141E e-meeting S2-2006929, Fraunhofer HHI, "KI#3, #8, Resolve EN in Sol #35: Authorization for 5G ProSe UE-to-Network Relay Service", Elbonia, Oct. 12-23, 2020.

SA WG2 Meeting #141E (e-meeting) S2-2007731, Interdigital Inc, "Evaluation and Interim Conclusion for Key Issue #3", Elbonia, Oct. 12-23, 2020.

"3rd Generation Partnership Project; Technical Specification GroupServices and System Aspects; Study on Architecture Enhancements to ProSe UE-to-Network Relay (Release 15)", 3GPP TR 23.733 v15.1.0 (Dec. 2017), pp. 1-81, XP051392106, figures 6.1.1.1-1, paragraphs [6.1.2.1], [6.2.3.1] -[6.2.3.2], paragraphs [6.2.3]-[6.2.3.2]. 81 pages.

Intel: "KI#3, Solution #42 Clarification and Update", 3GPP Draft; S2-2008372, 3rd Generation Partnership Project (3GPP), Mobile Competence Centre; 650, Route Des Lucioles; F-06921 Sophia-Antipolis Cedex; France, vol. SA WG2, No. Elbonia; Nov. 16, 2020-Nov. 20, 2020, Nov. 9, 2020 (Nov. 9, 2020), XP051952435, paragraph [6.42.1]. 2 pages.

Supplementary European Search Report in the European application No. 21933881.1, mailed on Dec. 14, 2023. 12 pages.

First Office Action of the European application No. 21933881.1, issued on Sep. 23, 2024, 8 pages.

Qualcomm Incorporated, "Additional considerations for Layer-2 UE-to-Network Relay solution", 3GPP SA WG2 Meeting #139E (e-meeting), S2-2004290, Elbonia, Jun. 1-12, 2020, section 2.5.

Huawei et al, "Evaluation of Layer 2 and Layer 3 relay", 3GPP SA WG2 Meeting #122-bis. S2-175928, Sophia Antipolis, France, Aug. 21-25, 2017, pp. 1-5.

Huawei et al, "KI#4, Sol#8: Updated on E2E PC5 link establishment for L2 UE-to-UE Relay", 3GPP TSG-WG SA2 Meeting #143E e-meeting, S2-2100731, Elbonia, Feb. 24-Mar. 9, 2020, pp. 1-4.

Huawei et al, "Evaluation of Layer 2 and Layer 3 relay", 3GPP SA WG2 Meeting #122-bis, S2-175927, Sophia Antipolis, France Aug. 21-25, 2017, pp. 1-20.

Second Office Action of the Chinese application No. 202310909325.0, issued on Nov. 26, 2024. 19 pages with English translation.

First Office Action of the Indian application No. 202327041128, issued on Dec. 23, 2024, 6 pages with English translation.

Intel, "KI#8, Solution #35 Clarification", 3GPP TSG-SA/WG2 Meeting #142e S2-2009460 (revision of S2-2008374r04) Elbonia, Nov. 16-20, 2020, pp. 1-5.

First Office Action of the Japanese application No. 2023-535696, issued on Feb. 4, 2025. 8 pages with English translation.

\* cited by examiner

RELAY MODE CONFIGURATION METHOD AND APPARATUS, RELAY COMMUNICATION METHOD AND APPARATUS, AND DEVICE

CROSS-REFERENCE TO RELATED APPLICATION

This is a continuation of International Patent Application No. PCT/CN2021/084741 filed on Mar. 31, 2021, which is incorporated herein by reference in its entirety.

TECHNICAL FIELD

Embodiments of the present disclosure relate to the technical field of communications, and in particular, to a method and apparatus for configuring a relay mode, a relay communication method and apparatus, and a device.

BACKGROUND

The 3rd Generation Partnership Project (3GPP) introduces a concept of relay communication in a Release 13 (R13) Proximity Service (ProSe) architecture.

A relay communication system includes at least two User Equipments (UEs) with Proximity Service (Prose) capabilities. These UE may generally be classified into two categories. One category is the UE providing a relay service, and the other category is the UE using the relay service. The UE with the Prose capability may establish a direct communication with another UE with the Prose capability by means of a PC5 interface. When the relay communication system is implemented by the UE accessing a network by means of a relay, if the UE has the capability of accessing an external data network by means of a network such as 5th-Generation (5G) and also has the Prose capability, the UE may provide the relay service. That is to say, the UE acts as the Relay UE in the relay communication system; and then in the relay communication system, other UE(s) access(es) the network by means of the UE, so as to use the relay service provided by the UE, that is, the other UE(s) act(s) as the Remote UE(s) in the relay communication system. When the relay communication system is implemented by a plurality of UEs performing service interaction by means of the relay, and when the UE can provide a communication relay for at least two UEs and can establish a direct communication with the at least two UEs by means of the PC5 interface, the UE may provide the relay service, that is, the UE acts as the Relay UE in the relay communication system; and the other UE(s) in the relay communication system that respectively establish(es) a direct communication with the UE by means of the PC5 interface use(es) the relay service provided by the UE.

However, during a relay communication of the UE with the Prose capability, how to determine a connection mode of a relay communication needs further discussion and research.

BRIEF DESCRIPTION OF THE DRAWINGS

In order to describe the technical solutions in embodiments of the present disclosure more clearly, the drawings required to be used in the embodiments will be simply introduced below. It is apparent that the drawings in the following descriptions are only some embodiments of the present disclosure. Those of ordinary skill in the art may further obtain other drawings according to these drawings without creative work.

DETAILED DESCRIPTION

Figure 1:
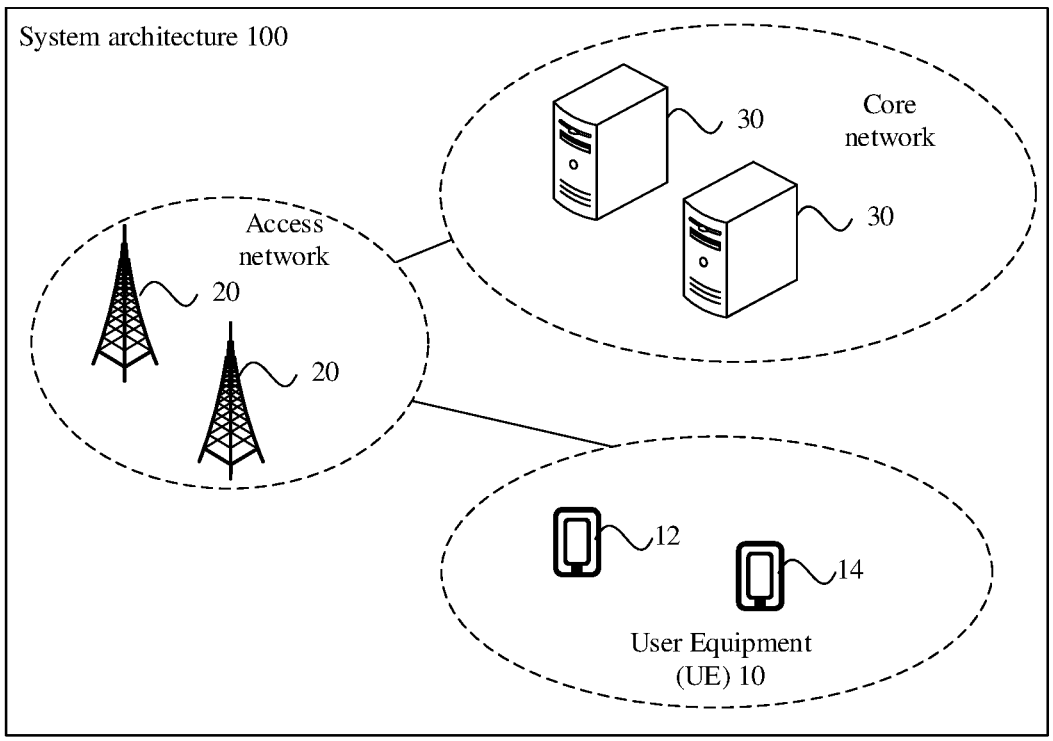
FIG. 1 is a schematic diagram of a system architecture of a communication system according to an embodiment of the present disclosure.

In order to make objectives, technical solutions, and advantages of the present disclosure clearer, the implementations of the present disclosure will be described in detail below with reference to the drawings.

The network architecture and service scenarios described in the embodiments of the present disclosure are for the purpose of describing the technical solutions of the embodiments of the present disclosure more clearly, and do not constitute a limitation on the technical solutions provided in the embodiments of the present disclosure. Those of ordinary skill in the art may learn that, with the evolution of the network architecture and the emergence of new service scenarios, the technical solutions provided in the embodiments of the present disclosure are also applicable to similar technical problems.

The embodiments of the present disclosure provide a method for configuring a relay mode and apparatus, a relay communication method and apparatus, and a device. Technical solutions include as follows.

In an aspect, an embodiment of the present disclosure provides a method for configuring a relay mode. The method is applied to the UE and includes the following operation.

First configuration information from a core network device is received. The first configuration information includes at least one relay mode configured for the UE by the core network device, and the UE is a device having a Proximity Service (Prose) capability.

In another aspect, an embodiment of the present disclosure provides a method for configuring a relay mode. The method is applied to a core network device and includes the following operation.

First configuration information is sent to UE. The first configuration information includes at least one relay mode configured for the UE by the core network device, and the UE is a device having a Prose capability.

In still another aspect, an embodiment of the present disclosure provides a relay communication method. The method is applied to first UE and includes the following operation.

Based on a first relay mode, a communication with second UE is achieved by means of relay UE.

The first relay mode is included in one or more relay modes corresponding to the first UE; the first relay mode is included in one or more relay modes corresponding to the relay UE; and the first relay mode is included in one or more relay modes corresponding to the second UE.

In yet another aspect, an embodiment of the present disclosure provides a relay communication method. The method is applied to relay UE and includes the following operation.

Based on a first relay mode, a communication between first UE and second UE is achieved by means of relay UE.

The first relay mode is included in one or more relay modes corresponding to the first UE; the first relay mode is included in one or more relay modes corresponding to the relay UE; and the first relay mode is included in one or more relay modes corresponding to the second UE.

In yet still another aspect, an embodiment of the present disclosure provides a relay communication method. The method is applied to second UE and includes the following operation.

Based on a first relay mode, a communication with first UE is achieved by means of relay UE.

The first relay mode is included in one or more relay modes corresponding to the first UE; the first relay mode is included in one or more relay modes corresponding to the relay UE; and the first relay mode is included in one or more relay modes corresponding to the second UE.

In yet still another aspect, an embodiment of the present disclosure provides an apparatus for configuring a relay mode. The apparatus is disposed in UE and includes a configuration information receiving module.

The configuration information receiving module is configured to receive first configuration information from a core network device. The first configuration information includes at least one relay mode configured for the UE by the core network device, and the UE is a device having a Prose capability.

In yet still another aspect, an embodiment of the present disclosure provides an apparatus for configuring a relay mode. The apparatus is disposed in a core network device and includes a configuration information sending module.

The configuration information sending module is configured to send first configuration information to UE. The first configuration information includes at least one relay mode configured for the UE by the core network device, and the UE is a device having a Prose capability.

In still another aspect, an embodiment of the present disclosure provides a relay communication apparatus. The apparatus is disposed in first UE and includes a first communication module.

The first communication module is configured to, based on a first relay mode, achieve a communication with second UE by means of relay UE.

The first relay mode is included in one or more relay modes corresponding to the first UE; the first relay mode is included in one or more relay modes corresponding to the relay UE; and the first relay mode is included in one or more relay modes corresponding to the second UE.

In yet another aspect, an embodiment of the present disclosure provides a relay communication apparatus. The apparatus is disposed in relay UE and includes a relay communication module.

The relay communication module is configured to, based on a first relay mode, achieve a communication between first UE and second UE by means of the relay UE.

The first relay mode is included in one or more relay modes corresponding to the first UE; the first relay mode is included in one or more relay modes corresponding to the relay UE; and the first relay mode is included in one or more relay modes corresponding to the second UE.

In yet still another aspect, an embodiment of the present disclosure provides a relay communication apparatus. The apparatus is disposed in second UE and includes a second communication module.

The second communication module is configured to, perform a communication with a first UE by means of a relay UE based on a first relay mode.

The first relay mode is included in one or more relay modes corresponding to the first UE; the first relay mode is included in one or more relay modes corresponding to the relay UE; and the first relay mode is included in one or more relay modes corresponding to the second UE.

In yet still another aspect, an embodiment of the present disclosure provides UE. The UE includes: a processor; and a transceiver connected to the processor.

The transceiver is configured to receive first configuration information from a core network device, wherein the first configuration information comprises at least one relay mode configured for the UE by the core network device, and the UE is a device having a Prose capability.

In yet still another aspect, an embodiment of the present disclosure provides a core network device. The core network device includes: a processor; and a transceiver connected to the processor.

The transceiver is configured to send first configuration information to UE, wherein the first configuration information comprises at least one relay mode configured for the UE by the core network device, and the UE is a device having a Prose capability.

In yet still another aspect, an embodiment of the present disclosure provides first UE. The first UE includes: a processor; and a transceiver connected to the processor.

The transceiver is configured to, based on a first relay mode, achieve a communication with second UE by means of relay UE.

The first relay mode is included in one or more relay modes corresponding to the first UE; the first relay mode is included in one or more relay modes corresponding to the relay UE; and the first relay mode is included in one or more relay modes corresponding to the second UE.

In yet still another aspect, an embodiment of the present disclosure provides relay UE. The relay UE includes: a processor; and a transceiver connected to the processor.

The transceiver is configured to, based on a first relay mode, achieve a communication between first UE and second UE by means of the relay UE.

The first relay mode is included in one or more relay modes corresponding to the first UE; the first relay mode is included in one or more relay modes corresponding to the relay UE; and the first relay mode is included in one or more relay modes corresponding to the second UE.

In yet still another aspect, an embodiment of the present disclosure provides second UE. The second UE includes: a processor; and a transceiver connected to the processor.

The transceiver is configured to, perform a communication with a first UE by means of a relay UE based on a first relay mode.

The first relay mode is included in one or more relay modes corresponding to the first UE; the first relay mode is included in one or more relay modes corresponding to the relay UE; and the first relay mode is included in one or more relay modes corresponding to the second UE.

In yet still another aspect, an embodiment of the present disclosure provides a computer-readable storage medium. The storage medium stores a computer program. The computer program is configured to be executed by a processor of UE, so as to implement the method for configuring a relay mode on a UE side as described above.

In yet still another aspect, an embodiment of the present disclosure provides a computer-readable storage medium. The storage medium stores a computer program. The computer program is configured to be executed by a processor of a core network device, so as to implement the method for configuring a relay mode on a core network device side as described above.

In yet still another aspect, an embodiment of the present disclosure provides a computer-readable storage medium. The storage medium stores a computer program. The computer program is configured to be executed by a processor of first UE, so as to implement the relay communication method on a first UE side as described above.

In yet still another aspect, an embodiment of the present disclosure provides a computer-readable storage medium. The storage medium stores a computer program. The computer program is configured to be executed by a processor of relay UE, so as to implement the relay communication method on a relay UE side as described above.

In yet still another aspect, an embodiment of the present disclosure provides a computer-readable storage medium. The storage medium stores a computer program. The computer program is configured to be executed by a processor of relay UE, so as to implement the relay communication method on a second UE side as described above.

In yet still another aspect, an embodiment of the present disclosure provides a chip. The chip includes a programmable logic circuit and/or program instructions. When the chip is operated on UE, the method for configuring a relay mode on a UE side as described above is implemented.

In yet still another aspect, an embodiment of the present disclosure provides a chip. The chip includes a programmable logic circuit and/or program instructions. When the chip is operated on a core network device, the method for configuring a relay mode on a core network device side as described above is implemented.

In yet still another aspect, an embodiment of the present disclosure provides a chip. The chip includes a programmable logic circuit and/or program instructions. When the chip is operated on first UE, the relay communication method on a first UE side as described above is implemented.

In yet still another aspect, an embodiment of the present disclosure provides a chip. The chip includes a programmable logic circuit and/or program instructions. When the chip is operated on relay UE, the relay communication method on a relay UE side as described above is implemented.

In yet still another aspect, an embodiment of the present disclosure provides a chip. The chip includes a programmable logic circuit and/or program instructions. When the chip is operated on second UE, the relay communication method on a second UE side as described above is implemented.

In yet still another aspect, an embodiment of the present disclosure provides a computer program product. When the computer program product is operated on UE, the method for configuring a relay mode on a UE side as described above is implemented.

In yet still another aspect, an embodiment of the present disclosure provides a computer program product. When the computer program product is operated on a core network device, the method for configuring a relay mode on a core network device side as described above is implemented.

In yet still another aspect, an embodiment of the present disclosure provides a computer program product. When the computer program product is operated on first UE, the relay communication method on a first UE side as described above is implemented.

In yet still another aspect, an embodiment of the present disclosure provides a computer program product. When the computer program product is operated on relay UE, the relay communication method on a relay UE side as described above is implemented.

In yet still another aspect, an embodiment of the present disclosure provides a computer program product. When the computer program product is operated on second UE, the relay communication method on a second UE side as described above is implemented.

The technical solutions provided in the embodiments of the present disclosure may include the following beneficial effects.

The core network device configures a relay mode for UE with a Prose capability, such that the UE can determine a connection mode of a relay communication, thereby ensuring that the UE can achieve the relay communication.

For the service interaction between relay communication systems of a plurality of UEs by means of relays, the relay communication process is executed by means of each UE by using the consistent relay mode, such that failure to establish the relay connection due to mismatching of the relay mode used by the UE is avoided, thereby ensuring that the relay communication is normally performed.

FIG. 1 is a schematic diagram of a system architecture of a communication system according to an embodiment of the present disclosure. As shown in FIG. 1, the system architecture 100 may include UE 10, an access network device 20 and a core network device 30.

The terminal device 10 may be the UE, an access terminal, a user unit, a user station, a mobile station, a mobile platform, a remote station, a remote terminal, a mobile device, a wireless communication device, a user agent, or a user apparatus. Optionally, the terminal device may further be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device of a wireless modem, a vehicle device, a wearable device, the UE in a 5th-Generation System (5GS), or the UE in a future evolved PLMN, and the embodiments of the present disclosure are not limited thereto.

The access network device 20 is a device that is deployed in an access network so as to provide a wireless communication function for the UE 10. The access network device 20 may include various forms of macro base stations, micro base stations, relay stations, access points, and the like. In systems using different wireless access technologies, the names of the devices that provide wireless communication functions may vary. Exemplarily, in the 5GS, the access network device may be called gNodeB or gNB. In an Evolved Packet System (EPS), the access network device may be called evolved NodeB (eNodeB). As a communication technology evolves, the name "access network device" may change. For ease of description, in this embodiment of the present disclosure, the above apparatus that provides the wireless communication function for the UE is collectively called the access network device.

The core network device 30 is a functional entity that is deployed in a core network so as to provide functions such as management and/or authentication for the UE 10. In some implementations, the core network device may also be called a core network element. As a communication technology evolves, the name "core network device" may change. For ease of description, in this embodiment of the present disclosure, the functional entities deployed in the core network are collectively called the core network device. In an example, the core network device 30 includes a device responsible for user policy management. Exemplarily, in the 5GS, the core network device 30 responsible for user policy management may be implemented as a Policy Control Function (PCF).

Figure 2:
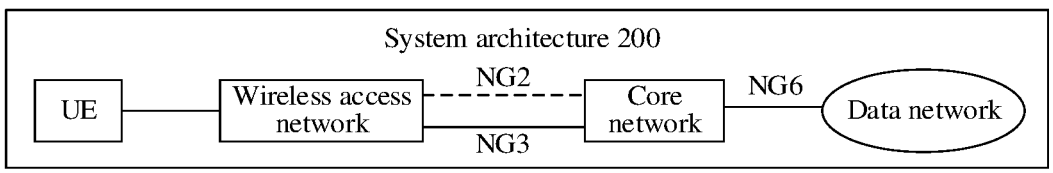
FIG. 2 is a schematic diagram of a 5GS architecture according to an embodiment of the present disclosure.

FIG. 2 is a schematic diagram of a system architecture of a 5GS according to an embodiment of the present disclosure. As shown in FIG. 2, the system architecture 200 may include UE, a (Radio) Access Network ((R)AN), core network (Core) and Data Network (DN). The UE, (R)AN and Core are main components of the system architecture. Logically, the UE, RAN and Core may be divided into a user plane and a control plane. The control plane is responsible for the management of a mobile network, and the user plane is responsible for the transmission of service data. As shown in FIG. 2, an NG2 reference point is located between an (R)AN control plane and a Core control plane; an NG3 reference point is located between an (R)AN user plane and a Core user plane; and an NG6 reference point is located between the Core user plane and a DN.

UE is an inlet that the mobile user interacts with the network, can provide basic computing capabilities and storage capabilities, display a service window to the user, and receive user operation input. The UE may use a next-generation radio technology to establish a signal connection and a data connection with the (R)AN, so as to transmit a control signal and service data to the mobile network.

(R)AN is similar to a base station in a legacy network, is deployed at a position close to the UE, provides a network access function for an authorized user in a specific area, and can use, according to the level of the users and the requirements of services, transmission tunnels with different qualities to transmit the user data. The (R)AN can manage and rationally use resources of itself to provide an access service for the UE as required, and forward the control signal and the user data between the UE and the core network.

Core is responsible for maintaining the subscription data of the mobile network, managing network elements of the mobile network, and providing functions such as session management, mobility management, policy management, and security authentication for the UE. During the UE attachment, network access authentication is provided for the UE. When the UE has a service request, a network resource is allocated for the UE. When the UE moves, the network resource is updated for the UE. When the UE is idle, a fast recovery mechanism is provided for the UE. During the UE detachment, the network resource is released for the UE. When the UE has service data, a data routing function is provided for the UE, for example, forwarding uplink data to the DN, or receiving UE downlink data from the DN to forward the data to the (R)AN, so as to send the data to the UE.

DN is a data network that provides a service for the user. Generally, a client is located in the UE, and a server is located in the DN. The DN may be a private network such as a local area network, or may be an external network that is not controlled by operators, such as the Internet, or may be a proprietary network jointly deployed by the operators, for example, for configuring an IP Multimedia Core Network Subsystem (IMS) service.

Figure 3:
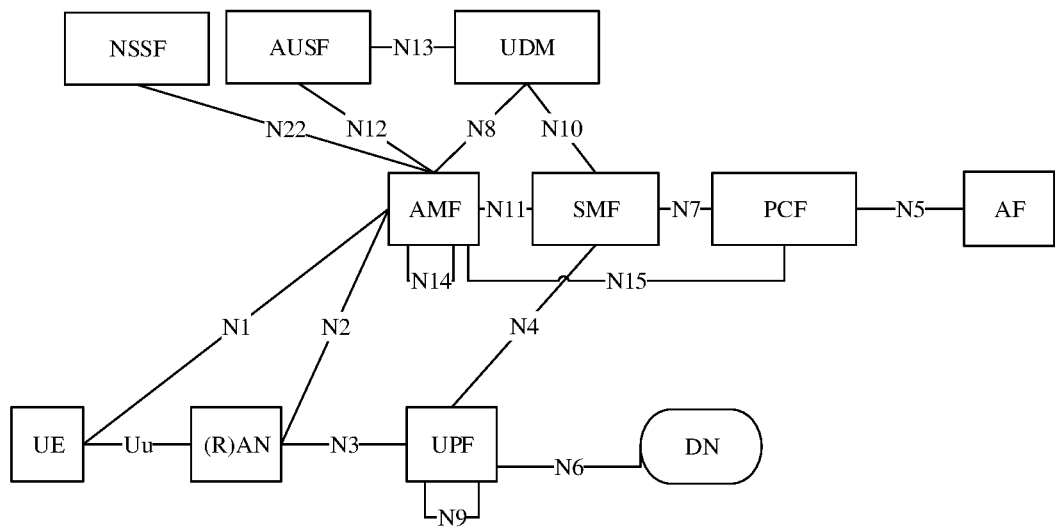
FIG. 3 is a schematic diagram of a 5GS architecture according to another embodiment of the present disclosure.

FIG. 3 is a schematic diagram of a detailed system architecture that is determined based on FIG. 2. The core network user plane includes a User Plane Function (UPF). The core network control plane includes an Authentication Server Function (AUSF), a Core Access and Mobility Management Function (AMF), a Session Management Function (SMF), a Unified Data Management (UDM), a PCF, and an Application Function (AF). The functions of these function entities are as follows.

UPF: Executing user data package forwarding according to a routing rule of the SMF.

AUSF: Executing security certification of the UE.

AMF: UE access management and mobility management.

SMF: UE session management.

UDM: User subscription context management.

PCF: User policy management.

AF: User application management.

In the system architecture shown in FIG. 3, a Uu interface is a reference point between the UE and the (R)AN, and the UE establishes an access stratum connection with the (R)AN by means of the Uu interface, so as to interact through access stratum messages and perform wireless data transmission; an N1 interface is a reference point between the UE and the AMF, and the UE establishes a None Access Stratum (NAS) connection with the AMF by means of the N1 interface, so as to interact through NAS messages; an N2 interface is a reference point between the (R)AN and the AMF, which is used for sending the NAS message; an N3 interface is a reference point between the (R)AN and the UPF, which is used for transmitting data of a user plane; N4 interface is a reference point between the SMF and the UPF, which is used for transmitting information such as tunnel identification information and data cache indication information of N3 connection, and a downlink data notification message; and N6 interface is a reference point between the UPF and the DN, which is used for transmitting the data of the user plane.

It is to be noted that, the name of the interface between the network elements in FIG. 2 and FIG. 3 is only an example. The name of the interface in a specific implementation may be other names, and the embodiments of the present disclosure are not specifically limited thereto. The name of each network element (such as UPF and the PCF) included in FIG. 2 and FIG. 3 is also only an example, and does not limit the function of the network element itself. In the 5G and other future networks, the above network elements may also have other names, and the embodiments of the present disclosure are not specifically limited thereto. For example, in a 6G network, part or all of the above network elements may use the terms in 5G, or may use other names, which are uniformly described herein, and are not described below again. In addition, it is to be understood that, the names of the messages (or signaling) transmitted between the above network elements are only an example, and do not constitute any limitation on the functions of the messages.

The 3GPP introduces the concept of a relay communication in an R13 ProSe architecture. A relay communication system includes at least two UEs with Prose capabilities. These UE may generally be classified into two categories. One category is the UE providing a relay service, and the other category is the UE using the relay service. The UE with a Prose capability may establish a direct communication with another UE with the Prose capability by means of a PC5 interface.

Figure 4:
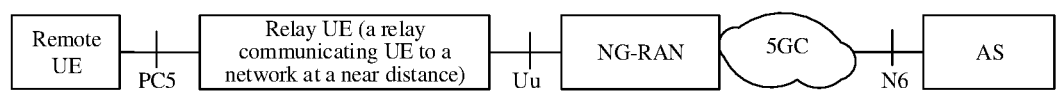
FIG. 4 is a schematic diagram of a relay communication system according to an embodiment of the present disclosure.

When the relay communication system is implemented as the UE accessing a network by means of a relay, if the UE has the capability of connecting an external data network by means of a network such as 5G and also has the Prose capability, the UE may provide the relay service. That is to say, the UE acts as the Relay UE in the relay communication system; and then the relay communication system accesses other UE(s) of the network by means of the UE, so as to use the relay service provided by the UE, that is, the other UE(s) act(s) as Remote UE(s) in the relay communication system. FIG. 4 is a schematic diagram of a relay communication system according to an embodiment of the present disclosure. In the relay communication system, the Remote UE accesses a network by means of the Relay UE. As shown in FIG. 4, the Remote UE may establish a direct communication with the Relay UE by means of the PC5 interface, and interacts with an external network by means of a PDU session established between the Relay UE and a network such as the 5G.

The relay communication process of the Remote UE accessing the network by means of the Relay UE may use different relay modes. In an example, based on the relay communication system shown in FIG. 4, the relay communication includes the following relay modes: a layer 3-based relay mode (or called "Layer-3 UE-to-Network Relays") and a layer 2-based relay mode (or called "Layer 2 UE-to-Network Relays").

Figure 5:
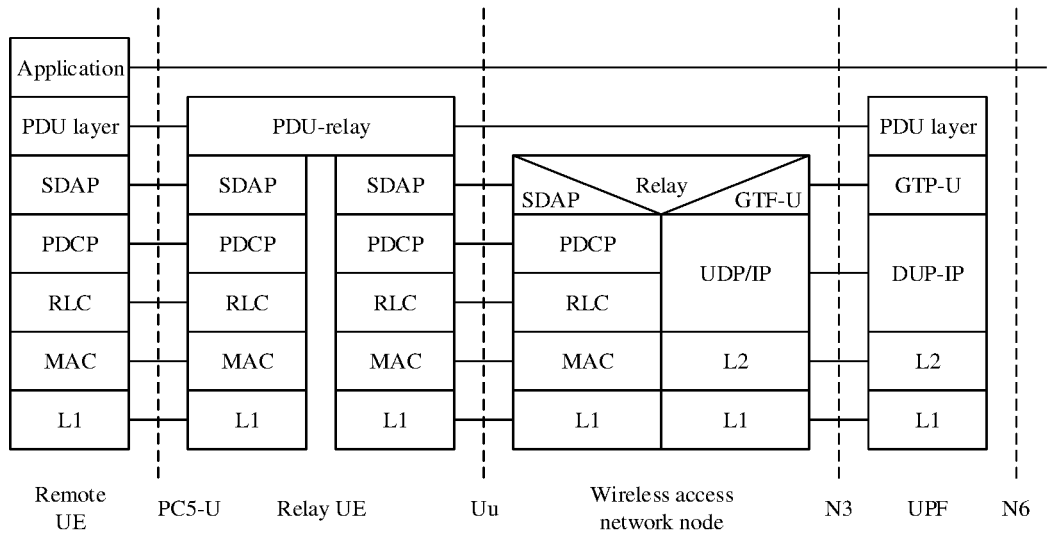
FIG. 5 is a schematic diagram of a user plane protocol stack of Layer-3 UE-to-Network Relays according to an embodiment of the present disclosure.

FIG. 5 is a schematic diagram of a user plane protocol stack of Layer-3 UE-to-Network Relays according to an embodiment of the present disclosure. As shown in FIG. 5, the PDU session is established between the Relay UE and a UPF entity serving the Relay UE. The data of the Remote UE is sent to the Relay UE by means of the PC5 interface, and then is forwarded to the external network by means of the PDU session established between the Relay UE and the UPF.

Figure 6:
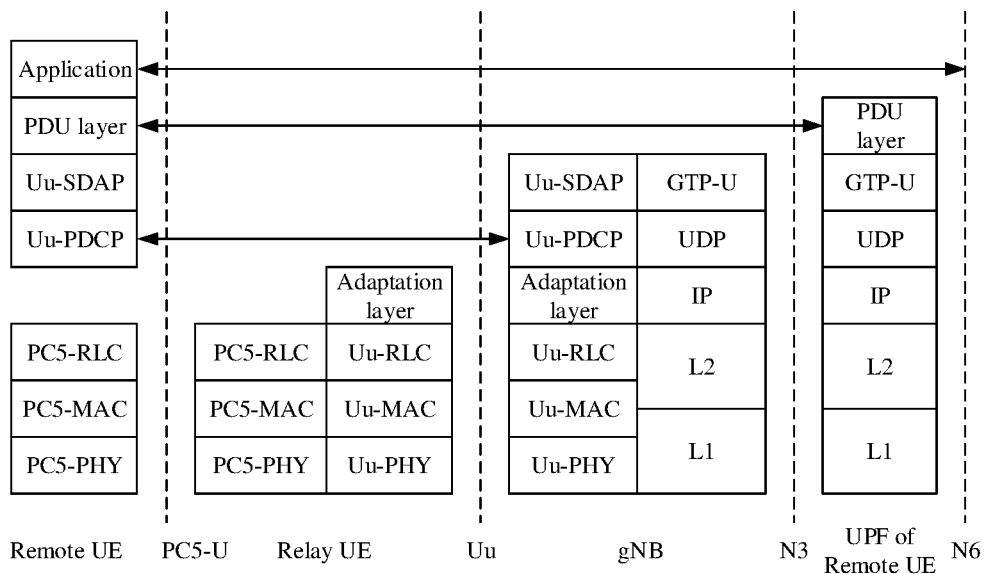
FIG. 6 is a schematic diagram of a user plane protocol stack of Layer-2 UE-to-Network Relays according to an embodiment of the present disclosure.

FIG. 6 is a schematic diagram of a user plane protocol stack of Layer-2 UE-to-Network Relays according to an embodiment of the present disclosure. As shown in FIG. 6, the Relay UE only relays the data over an air interface between the Remote UE and a network device (gNB) serving the Remote UE. The PDU session is established between the Relay UE and the UPF entity serving the Remote UE, such that the data of the Remote UE is forwarded to the external network by means of the PDU session established between the Remote UE and the UPF.

Figure 7:
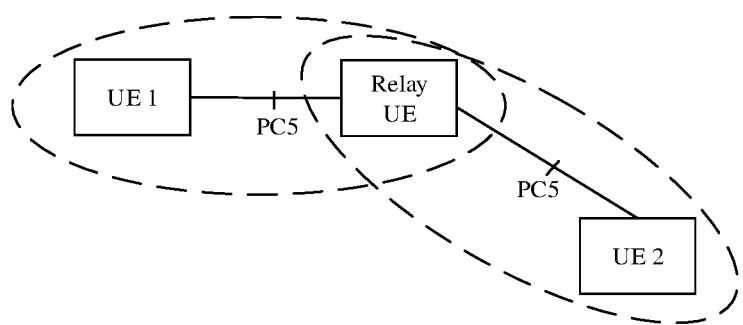
FIG. 7 is a schematic diagram of a relay communication system according to another embodiment of the present disclosure.

When the relay communication system is implemented as a plurality of UEs achieving service interaction by means of the relay, and when the UE can provide a communication relay for at least two UEs and can establish a direct communication with the at least two UEs by means of the PC5 interface, the UE may provide the relay service, that is, the UE acts as the Relay UE in the relay communication system; and other UE(s) in the relay communication system that respectively establish(es) the direct communication with the UE by means of the PC5 interface use the relay service provided by the UE. FIG. 7 is a schematic diagram of a relay communication system according to an embodiment of the present disclosure. In the relay communication system, in one aspect, the Relay UE establishes a direct communication with UE 1 with a Prose capability by means of the PC5 interface, and in the other aspect, the Relay UE establishes a direct communication with UE 2 with the Prose capability by means of the PC5 interface, such that a service interaction between the UE 1 and the UE 2 can be achieved by means of the Relay UE.

The relay communication process of a plurality of UEs performing service interaction by means of a relay may use different relay modes. In an example, based on the relay communication system shown in FIG. 7, the relay communication includes the following relay modes: a layer 3-based relay mode and a layer 2-based relay mode.

Figure 8:
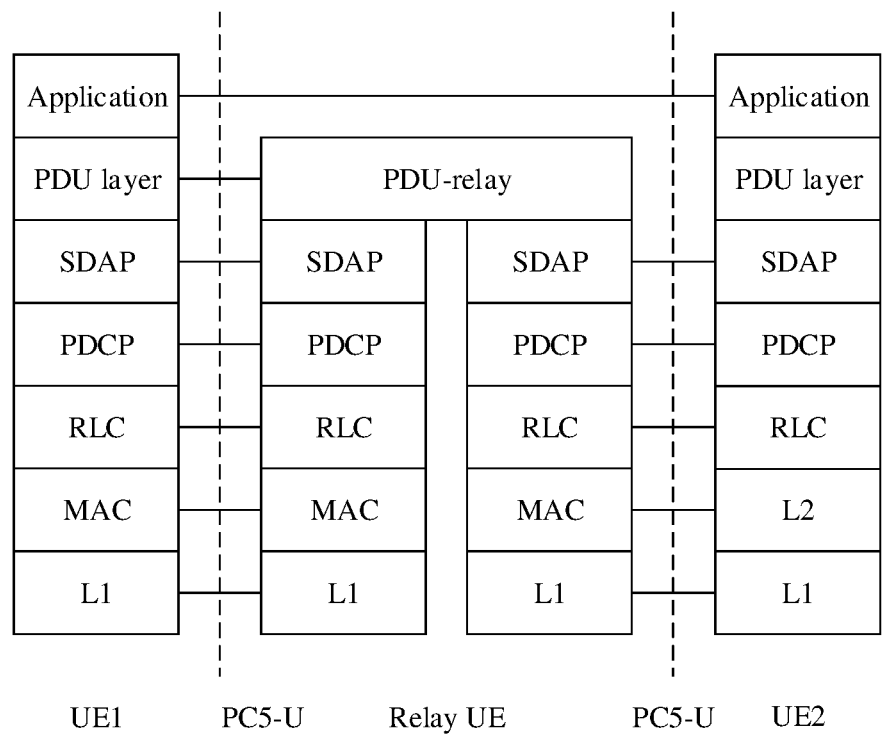
FIG. 8 is a schematic diagram of a user plane protocol stack of Layer-3 UE-to-Network Relays according to another embodiment of the present disclosure.

FIG. 8 is a schematic diagram of a user plane protocol stack of Layer-3 UE-to-Network Relays according to an embodiment of the present disclosure. As shown in FIG. 8, Relay UE establishes a direct communication with UE 2 by means of the PC5 interface. The data of UE 1 is sent to the Relay UE by means of the PC5 interface, and then is forwarded to the UE 2 by means of the PC5 interface between the Relay UE and the UE 2.

Figure 9:
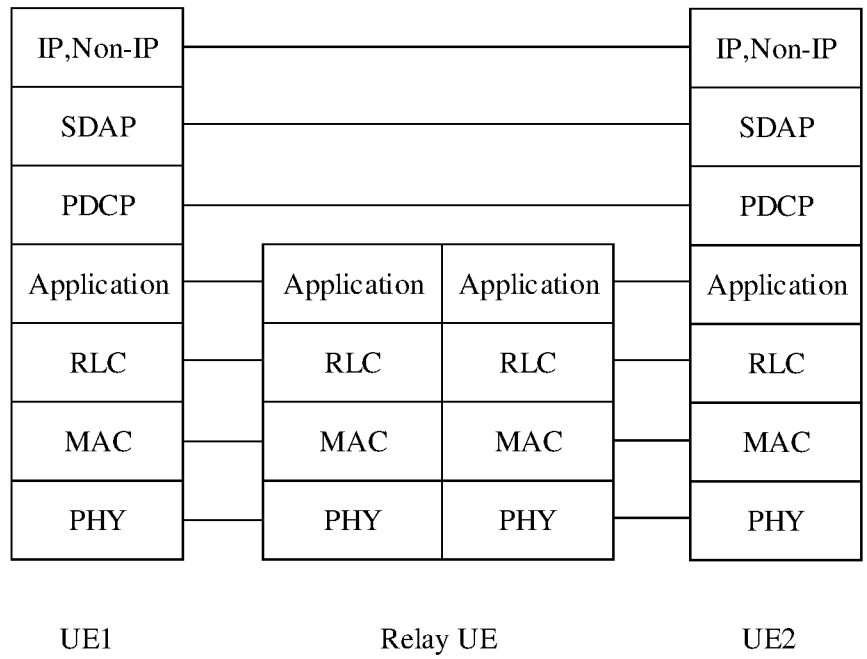
FIG. 9 is a schematic diagram of a user plane protocol stack of Layer-2 UE-to-Network Relays according to another embodiment of the present disclosure.

FIG. 9 is a schematic diagram of a user plane protocol stack of Layer-2 UE-to-Network Relays according to an embodiment of the present disclosure. As shown in FIG. 9, Relay UE only relays the data over protocol layers below a Packet Data Convergence Protocol (PDCP) between UE 1 and UE 2. From an NAS, it appears that the UE 1 directly interacts with the UE 2 by means of the PC5 interface.

In some implementations, the relay modes that can be used during relay communication of different UEs with the Prose capabilities differ from one UE to another. With regard to the relay communication system being implemented as the UE accessing the network by means of a relay, if Remote UE uses a different relay mode from the Relay UE, a relay communication connection cannot be established correctly; and with regard to the relay communication system being implemented as the plurality of UEs performing service interaction, if the UE 1 and the UE 2 use the different relay modes from the Relay UE, the relay communication connection cannot be established correctly either. Therefore, during relay communication, the way that the UE with the Prose capability determines a relay communication connection mode (including the relay mode of itself and/or the relay mode(s) of other UE(s)) needs to be further discussed and studied.

Based on this, an embodiment of the present disclosure provides a method for configuring a relay mode and a relay communication method, which may be used for solving the above technical problem. The technical solutions of the present disclosure are described below by means of several embodiments.

It should be understood that, a "relay mode" described in the embodiments of the present disclosure refers to a relay communication connection mode. In some implementations, the "relay mode" may also be called a "relay connection mode", a "relay communication mode", or the like, and the embodiments of the present disclosure are not limited thereto. For ease of description, in the following embodiments, the relay communication connection mode is collectively called the "relay mode".

Figure 10:
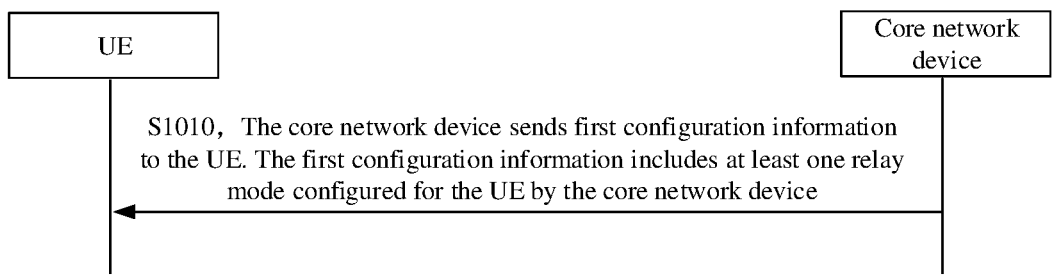
FIG. 10 is a flowchart of a method for configuring a relay mode according to an embodiment of the present disclosure.

FIG. 10 is a flowchart of a method for configuring a relay mode according to an embodiment of the present disclosure. The method may be applied to the communication system shown in FIG. 1. The method may include at least part of the following steps.

At S1010, a core network device sends first configuration information to UE. The first configuration information includes at least one relay mode configured for the UE by the core network device.

The UE is a device with a Prose capability. The type of the UE is not limited in the embodiments of the present disclosure. In an example, the UE is a UE providing a relay service. Optionally, the UE providing the relay service may be implemented as Relay UE. In another example, the UE is a UE using the relay service. Optionally, for a relay communication process in which the UE accesses a network by means of a relay, the UE using the relay service may be implemented as Remote UE; and for a relay communication process in which a plurality of UEs performs service interaction by means of relay, the UEs using the relay service may be implemented as the plurality of UEs that cannot establish a direct communication by means of a PC5 interface.

In order to enable the UE with the Prose capability to determine the mode of relay communication, the core network device sends the first configuration information to the UE. The first configuration information includes at least one relay mode configured for the UE by the core network device. Therefore, the UE may use the relay mode configured for the UE by the core network device to execute the subsequent relay communication process. Optionally, the core network device includes a PCF. The sending mode of the first configuration information is not limited in the embodiments of the present disclosure. In an example, the first configuration information is independent of other information. For example, the core network device separately sends the first configuration information to the UE. In another example, the first configuration information is carried in other information sent to the UE by the core network device, such that the number of messages between the core network device and the UE may be prevented from being increased. Optionally, when the first configuration information is carried in other information sent to the UE by the core network device, the first configuration information is carried in Prose configuration information, or the first configuration information is carried in UE Route Selection Policy (URSP) configuration information.

The type of at least one relay mode included in the first configuration information is not limited in the embodiments of the present disclosure. Optionally, the at least one relay mode includes at least one of the following: a layer 3-based relay mode, or a layer 2-based relay mode. Definitely, the at least one relay mode configured for the UE by the core network device may further include relay modes of other types. For example, the at least one relay mode may further include a relay mode based on a Non-3GPP Inter Working Function (N3IWF) (or called a "N3IWF-based relay"). It should be understood that, with the development of the communication technology, the type of new relay modes may be proposed, which shall all be included within the scope of protection of the present disclosure.

From the above introduction, it can be learned that, the first configuration information is used for configuring configuration information of a relay mode for the UE. In the embodiments of the present disclosure, the first configuration information may further include, in addition to the at least one relay mode, other information associated with the at least one relay mode, for example, use condition information corresponding to each relay mode respectively, indication information corresponding to each relay mode respectively, and the like. Other information that may be included in the first configuration information is introduced and described below.

In an example, the first configuration information further includes at least one Relay Service Code (RSC), each corresponding to a respective one of at least one relay mode. That is to say, the core network device configures, for the UE, a mapping relationship between relay modes and RSCs. Therefore, the UE may determine the relay mode corresponding to the RSC based on the first configuration information, or determine the RSC corresponding to the relay mode. From the above introduction, it can be learned that, a normal relay communication can only be guaranteed when the UE in relay communication uses the same relay mode, such that in addition to determining the one or more relay modes corresponding to one or more relay modes corresponding to the UE, the UE further needs to determine the relay modes corresponding to the other UE(s) in the relay communication, so as to ensure that the relay communication can be performed in the same relay mode.

Figure 11:
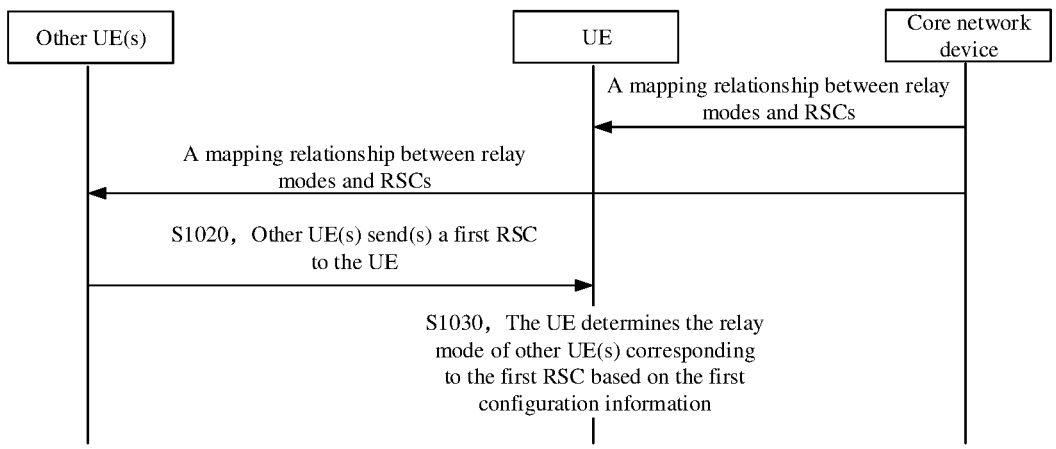
FIG. 11 is a flowchart of a method for configuring a relay mode according to another embodiment of the present disclosure.

Based on this, optionally, as shown in FIG. 11, the method further includes: at S1020, other UE(s) send(s) a first RSC to the UE; and at S1030, the UE determines the relay mode of the other UE(s) corresponding to the first RSC based on the first configuration information. The relay mode(s) that is/are configured for the other UE(s) by the core network device include the relay mode corresponding to the first RSC. In order to enable the understanding of the UE to be consistent with that of the other UE(s) on the relay mode corresponding to the RSC, the mapping relationship between relay modes and the RSCs configured for different UEs by the core network device needs to remain the same. Exemplarily, as shown in FIG. 11, the core network device configures, for the plurality of UEs, the same mapping relationship between relay modes and RSCs, such that for a certain RSC, different UEs may understand the same relay mode based on the mapping relationship configured by the core network device.

In the embodiments of the present disclosure, for the solution that the core network device configures the relay modes for different UEs, the relay modes configured for different UEs by the core network device may be the same. For example, the relay modes configured for all UEs by the core network device are the layer 2-based relay mode and the layer 3-based relay mode; or the core network device configures the relay modes for different UEs differently based on the capabilities of different UEs. For example, if the UE only supports the layer 2-based relay mode, and then the relay mode configured for the UE by the core network device is the layer 2-based relay mode.

Figure 12:
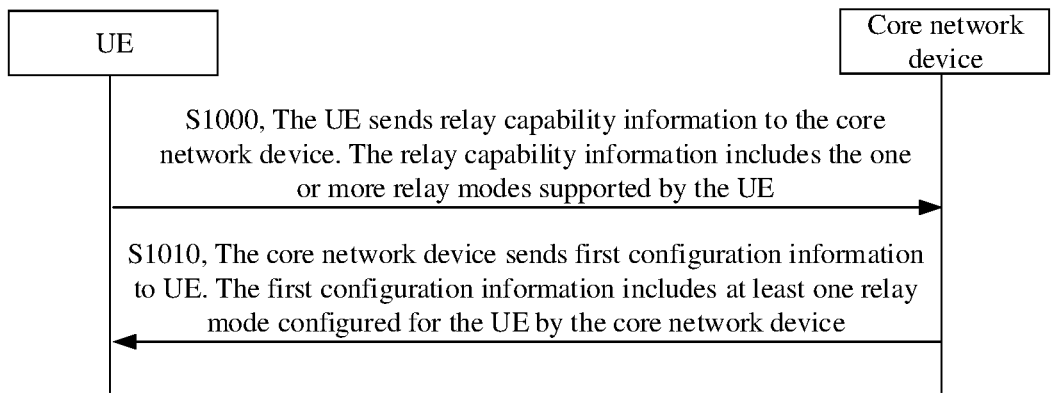
FIG. 12 is a flowchart of a method for configuring a relay mode according to still another embodiment of the present disclosure.

For the solution that the core network device configures the relay modes for different UEs differently based on the capabilities of different UEs, the UE needs to first report the capability of the UE to the core network device. Based on this, optionally, as shown in FIG. 12, before S1010, the method further includes: in S1000, the UE sends relay capability information to the core network device. The relay capability information includes the one or more relay modes supported by the UE. Optionally, the one or more relay modes supported by the UE includes at least one of the following: a layer 3-based relay mode, or a layer 2-based relay mode. Based on this, optionally, the at least one relay mode configured for the UE by the core network device is included in the one or more relay modes supported by the UE. That is to say, the relay mode configured for the UE by the core network device meets the capability of the UE.

In another example, the first configuration information further includes use condition information corresponding to the at least one relay mode respectively. The use condition information corresponding to certain relay mode indicates a condition using the relay mode. The content of the use condition information is not limited in the embodiments of the present disclosure. Exemplarily, the use condition information includes at least one of the following: time information, area information, or service information. The time information indicates a time condition for using the relay mode; the area information indicates an area condition for using the relay mode. Optionally, the area information includes at least one of the following: identification corresponding to a PLMN, identification corresponding to TA, or identification corresponding to a geographical area (for example, longitude information and/or latitude information). The service information indicates a service type for using the relay mode. Optionally, the service information includes at least one of the following: service type identification, or an RSC.

To sum up, according to the technical solutions provided in the embodiments of the present disclosure, the core network device configures the relay mode for the UE with the Prose capability, such that the UE can determine the connection mode of the relay communication, thereby ensuring that the UE can achieve the relay communication. Furthermore, when configuring the relay mode for the UE with the Prose capability, the core network device may also configure, for the UE, the RSC corresponding to the relay mode, such that the UE may determine, based on the configuration information sent by the core network device, not only the relay mode corresponding to the RSC, but also the RSC corresponding to the relay mode. In addition, the core network device configures, for the plurality of UEs, the same mapping relationship between relay modes and RSCs, such that when receiving the RSC(s) from the other UE(s) during the subsequent relay communication, the UE may determine, based on the configuration information sent by the core network device, the relay mode of the other UE(s) corresponding to the RSC, so as to cause the UE to use the same relay mode as the other UE(s), thereby guaranteeing the normal relay communication.

It is to be noted that, according to the embodiments corresponding to FIG. 10 to FIG. 12, the method for configuring the relay mode provided in the embodiments of the present disclosure is described from the perspective of interaction between the UE and the core network device. The steps executed by the UE may be implemented separately as the method for configuring the relay mode on a UE side; and the steps executed by the core network device may be implemented separately as the method for configuring the relay mode on a core network device side.

Figure 13:
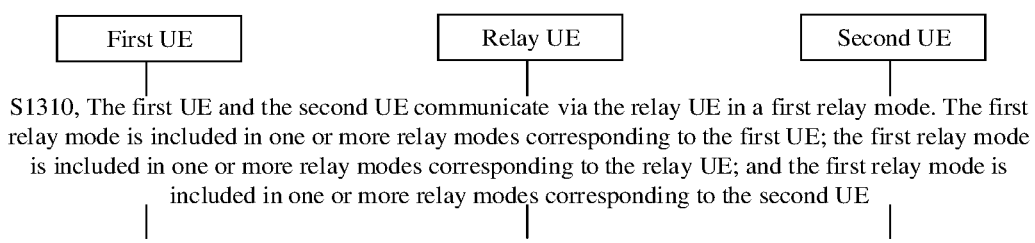
FIG. 13 is a flowchart of a relay communication method according to an embodiment of the present disclosure.

FIG. 13 is a flowchart of a relay communication method according to an embodiment of the present disclosure. The method may be applied to the relay communication system shown in FIG. 7. The method may include at least part of the following steps.

At S1310, a communication between first UE and second UE is achieved by means of relay UE based on a first relay mode. The first relay mode is included in one or more relay modes corresponding to the first UE; the first relay mode is included in one or more relay modes corresponding to the relay UE; and the first relay mode is included in one or more relay modes corresponding to the second UE.

The relay communication system in this implementation includes the first UE, the relay UE and the second UE. The relay UE may not only establish a direct communication with the first UE by means of a PC5 interface, but also establish a direct communication with the second UE by means of the PC5 interface. The first UE and the second UE cannot directly establish a direct communication by means of the PC5 interface, such that service interaction between the first UE and the second UE is relayed by the relay UE.

From the above introduction, it can be learned that, in order to guarantee a normal relay communication, during the process of communication between the first UE and the second UE by means of the relay UE, the relay modes used by the first UE, the relay UE and the second UE need to remain the same. Based on this, in this embodiment of the present disclosure, the communication between the first UE and the second UE is achieved by means of the relay UE based on a first relay mode. The first relay mode is a relay mode jointly corresponding to the first UE, the relay UE and the second UE. That is to say, the first relay mode is included in the one or more relay modes corresponding to the first UE; the first relay mode is included in the one or more relay modes corresponding to the relay UE; and the first relay mode is included in the one or more relay modes corresponding to the second UE. For the description of the first relay mode, the following embodiments may be referred to, and details are not described herein again.

In this embodiment of the present disclosure, the type of the relay mode corresponding to each UE respectively in the relay communication system is not limited. In an example, the one or more relay modes corresponding to one or more relay modes corresponding to the first UE includes at least one of the following: a layer 3-based relay mode, or a layer 2-based relay mode. The one or more relay modes corresponding to one or more relay modes corresponding to the relay UE include at least one of the following: a layer 3-based relay mode, or a layer 2-based relay mode. The one or more relay modes corresponding to one or more relay modes corresponding to the second UE include at least one of the following: a layer 3-based relay mode, or a layer 2-based relay mode. Definitely, the relay mode corresponding to each UE respectively may further include relay modes of other types, for example, an N3IWF-based relay mode. It should be understood that, all these relay modes shall be included within the scope of protection of the present disclosure.

Exemplarily, the one or more relay modes corresponding to one or more relay modes corresponding to the first UE include the layer 3-based relay mode, the one or more relay modes corresponding to one or more relay modes corresponding to the second UE include the layer 2-based relay mode and the layer 3-based relay mode, and the one or more relay modes corresponding to one or more relay modes corresponding to the relay UE include the layer 2-based relay mode, the layer 3-based relay mode and the N3IWF-based relay mode, such that it may be determined that the relay mode used by each UE is the layer 3-based relay mode when performing the communication between the first UE and the second UE by means of the relay UE. That is to say, the first relay mode is the layer 3-based relay mode.

In this embodiment of the present disclosure, a method for determining the relay mode corresponding to each UE respectively in the relay communication system is not limited. In an example, the one or more relay modes corresponding to one or more relay modes corresponding to the first UE include any one of the following: a relay mode supported by the first UE, and a relay mode supported by the first UE and configured for the first UE by a core network device. The one or more relay modes corresponding to one or more relay modes corresponding to the relay UE include any one of the following: a relay mode supported by the relay UE, and a relay mode supported by the relay UE and configured for the relay UE by the core network device. The one or more relay modes corresponding to one or more relay modes corresponding to the second UE include any one of the following: a relay mode supported by the second UE, and a relay mode supported by the second UE and configured for the second UE by the core network device.

To sum up, according to the technical solutions provided in the embodiments of the present disclosure, in a relay communication system in which a plurality of UEs perform service interaction by means of relay, the plurality of UEs perform the relay communication process by using the same relay mode, such that failure to establish the relay connection due to mismatching of the relay mode used by the UEs is avoided, thereby ensuring normal proceeding of the relay communication.

In this embodiment of the present disclosure, the entity for determining the first relay mode is not limited. In an example, the first relay mode is determined by the first UE. For example, the first UE may acquire the relay modes corresponding to the relay UE and the second UE, and determines the first relay mode in view of the one or more relay modes corresponding to one or more relay modes corresponding to the first UE. In another example, the first relay mode is determined by the second UE. For example, the second UE may acquire the relay modes corresponding to the relay UE and the first UE, and determines the first relay mode in view of the one or more relay modes corresponding to one or more relay modes corresponding to the second UE. In still another example, the first relay mode is determined by the relay UE. For example, the relay UE may acquire the relay modes corresponding to the first UE and the second UE, and determines the first relay mode in view of the one or more relay modes corresponding to one or more relay modes corresponding to the relay UE. In yet another example, the first relay mode is directly configured by the core network device. For example, the core network device configures the same and unique relay mode for the first UE, the second UE and the relay UE, and each UE subsequently uses the relay mode configured by the core network device for relay communication.

Two solutions that the first relay mode is determined by the first UE and the first relay mode is determined by the second UE are respectively introduced and described below. It should be understood that, after those skilled in the art understand the technical solutions of the present disclosure, the technical solution of determining the first relay mode by the relay UE would readily be conceivable for those skilled in the art, and these technical solutions shall all fall within the scope of protection of the present disclosure. In an actual application, considering factors such as the number of messages between the UEs and the processing overhead, the technical solution of determining the first relay mode is by the first UE or the second UE may be employed.

First, the technical solution of determining the first relay mode by the first UE is introduced and described.

Figure 14:
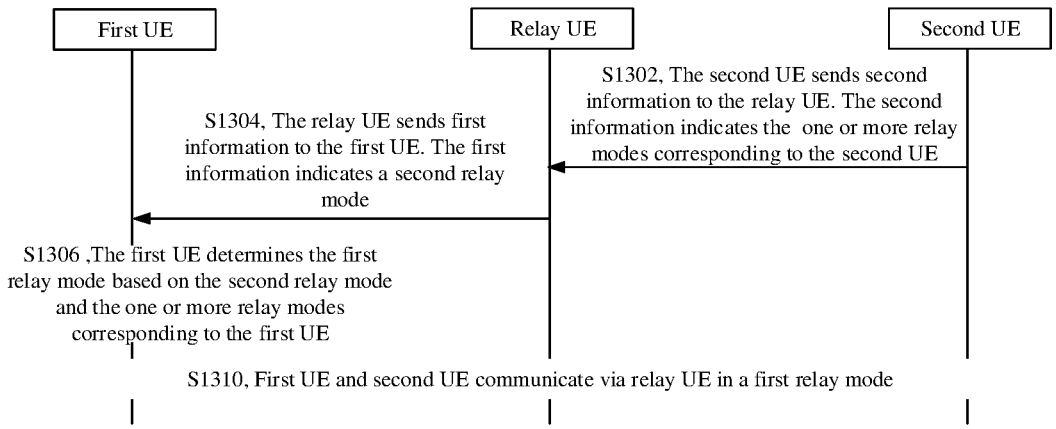
FIG. 14 is a flowchart of a relay communication method according to another embodiment of the present disclosure.

In a possible implementation, as shown in FIG. 14, before S1310, the method further includes the following steps.

At S1302, the second UE sends second information to the relay UE. The second information indicates the one or more relay modes corresponding to one or more relay modes corresponding to the second UE.

In this implementation, the first UE determines the first relay mode, such that the second UE needs to send the one or more relay modes corresponding to one or more relay modes corresponding to the second UE to the first UE. Since the second UE and the first UE cannot establish a direct communication by means of the PC5 interface, the second UE needs to relay by means of the relay UE, so as to achieve the purpose of information interaction with the first UE.

Based on this, the second UE sends the second information to the relay UE. The second information indicates the one or more relay modes corresponding to one or more relay modes corresponding to the second UE. For a specific sending mode of the second information, refer to the following embodiments, such that details are not described herein again. The method for indicating the one or more relay modes corresponding to one or more relay modes corresponding to the second UE is not limited in this embodiment of the present disclosure. In an example, the one or more relay modes corresponding to one or more relay modes corresponding to the second UE are clearly indicated in the second information, for example, the second information includes a parameter configuration of the one or more relay modes corresponding to one or more relay modes corresponding to the second UE. In another example, the one or more relay modes corresponding to one or more relay modes corresponding to the second UE are implicitly indicated in the second information, for example, the second information includes an RSC(s) corresponding to the one or more relay modes corresponding to one or more relay modes corresponding to the second UE. Insofar as the second information includes the RSC(s) corresponding to the one or more relay modes corresponding to one or more relay modes corresponding to the second UE, the core network device may configure the same mapping relationship between relay modes and RSCs for each UE in advance. A specific configuration process may refer to the embodiments corresponding to FIG. 10 to FIG. 12, which is not described herein again.

At S1304, the relay UE sends first information to the first UE. The first information indicates a second relay mode, and is determined based on the second information.

Since the first relay mode is the relay mode that is used by all UEs, the relay UE also needs to send the one or more relay modes corresponding to one or more relay modes corresponding to the relay UE to the first UE. In this implementation, after receiving the second information from the second UE, the relay UE determines the first information based on the second information and the one or more relay modes corresponding to one or more relay modes corresponding to the relay UE, and sends the first information to the first UE, so as to notify the relay modes corresponding to the relay UE and the second UE to the first UE.

The first information sent by the relay UE indicates the second relay mode. In an example, the second relay mode includes: the one or more relay modes corresponding to one or more relay modes corresponding to the relay UE and the one or more relay modes corresponding to one or more relay modes corresponding to the second UE. Exemplarily, after receiving the second information from the second UE, the relay UE directly adds an indication of the one or more relay modes corresponding to one or more relay modes corresponding to the relay UE based on the second information, so as to obtain the first information, and sends the first information to the first UE. In another example, the second relay mode includes a relay mode common to the relay mode(s) corresponding to the relay UE and the relay mode(s) corresponding to the second UE. Exemplarily, after receiving the second information from the second UE, the relay UE determines the common relay mode of the second UE and the relay UE based on the relay mode(s) corresponding to the second UE indicated by the second information and the relay mode(s) corresponding to the relay UE, then obtains the first information based on the indication of the common relay mode, and sends the first information to the first UE.

The method for indicating the second relay mode is not limited in this embodiment of the present disclosure. In an example, the second relay mode is clearly indicated in the first information, for example, the first information includes a parameter configuration corresponding to the second relay mode. In another example, the second relay mode is implicitly indicated in the first information, for example, the first information includes an RSC corresponding to the second relay mode. Insofar as the first information includes the RSC corresponding to the second relay mode, the core network device may configure the same mapping relationship between relay modes and RSCs for each UE in advance. A specific configuration process may refer to the embodiments corresponding to FIG. 10 to FIG. 12, which are not described herein again. Since the relay UE may establish a direct communication with a plurality of second UEs by means of the PC5 interface, the relay UE may receive the second information from the plurality of second UEs. In order to enable the first UE to learn the one or more relay modes corresponding to one or more relay modes corresponding to each second UE, so as to facilitate the first UE to select, from the plurality of second UEs, an appropriate second UE for relay communication, optionally, the first information further includes identification information of the second UE. The identification information of the second UE is used for identifying the second UE.

At S1306, the first UE determines the first relay mode based on the second relay mode and the one or more relay modes corresponding to one or more relay modes corresponding to the first UE.

After receiving the first information from the relay UE, the first UE may learn the second relay mode indicated by the first information, and determine, based on the second relay mode and the one or more relay modes corresponding to one or more relay modes corresponding to the first UE, the first relay mode used in the relay communication. Optionally, the first UE determines the relay mode common to the second relay mode and the relay mode(s) corresponding to the first UE as the first relay mode.

The mode of sending information is introduced and described below.

Figure 15:
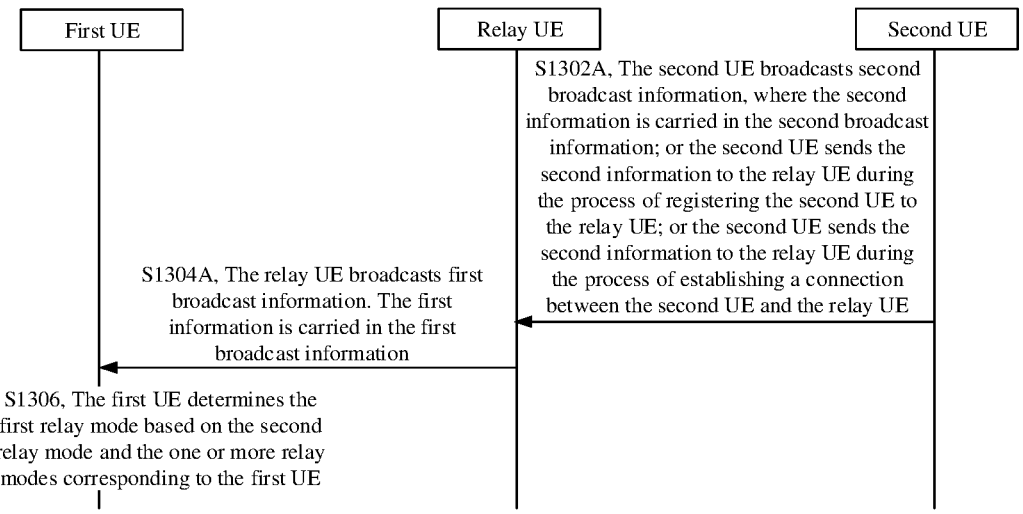
FIG. 15 is a flowchart of a relay mode determination method according to an embodiment of the present disclosure.

In an example, as shown in FIGS. 15, S1302 to S1306 are implemented as the following steps respectively (S1302 is implemented as S1302A, S1304 is implemented as S1304A, and S1306 is implemented as S1306).

At S1302A, the second UE broadcasts second broadcast information, where the second information is carried in the second broadcast information; or the second UE sends the second information to the relay UE during the process of registering the second UE to the relay UE; or the second UE sends the second information to the relay UE during the process of establishing a connection between the second UE and the relay UE.

The second UE may broadcast the second information by carrying the second information in the second broadcast information, such that the relay UE receives the second information when detecting the second broadcast information of the second UE. Alternatively, the second UE may send the second information to the relay UE when being registered to the relay UE. Alternatively, the second UE may send the second information to the relay UE during the process of establishing connection with the relay UE.

At S1304A, the relay UE broadcasts first broadcast information. The first information is carried in the first broadcast information.

After receiving the second information from the second UE, the relay UE determines the first information based on the second information and the relay mode(s) corresponding to the relay UE, and broadcasts the first information by carrying the first information in the first broadcast information, such that the first UE receives the first information when detecting the first broadcast information of the relay UE.

At S1306, the first UE determines the first relay mode based on the second relay mode and the relay mode(s) corresponding to the first UE.

Figure 16:
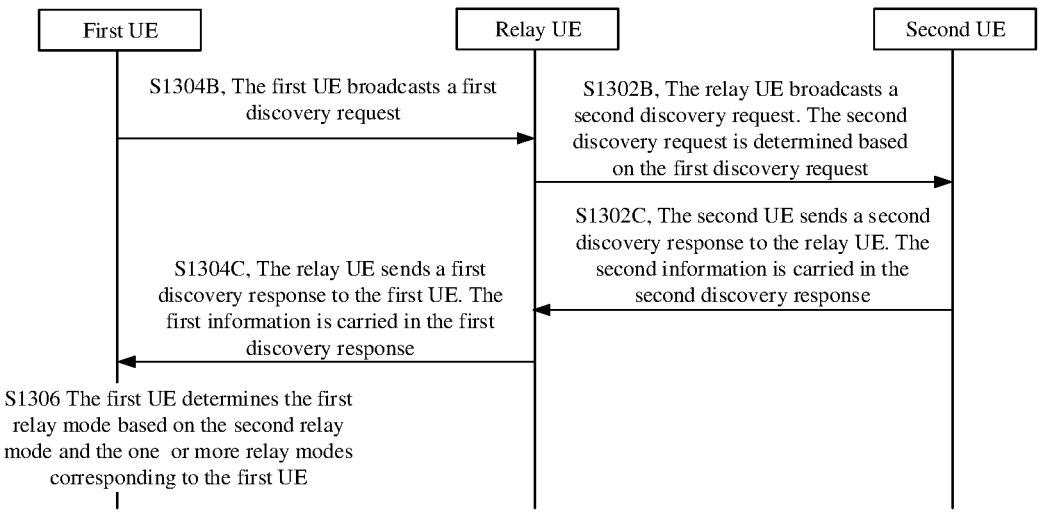
FIG. 16 is a flowchart of a relay mode determination method according to another embodiment of the present disclosure.

In another example, as shown in FIGS. 16, S1302 to S1304 are implemented as the following steps respectively (S1302 is implemented as S1302B and S1302C, S1304 is implemented as S1304B and S1304C, and S1306 is implemented as S1306).

At S1304B, the first UE broadcasts a first discovery request.

The first UE may broadcast the first discovery request during device discovery, and the first discovery request is used for requesting discovery of the relay UE and the second UE for a corresponding relay service. The content of the first discovery request is not limited in the embodiments of the present disclosure. Optionally, the first discovery request includes a service type identification of the relay service, an RSC of the relay service, a device identification of the first UE, and the like.

At S1302B, the relay UE broadcasts a second discovery request. The second discovery request is determined based on the first discovery request.

After detecting the first discovery request of the first UE, the relay UE determines the second discovery request based on the first discovery request, and broadcasts the second discovery request. Optionally, the relay UE may direct forward the first discovery request of the first UE. That is to say, the second discovery request and the first discovery request have the same content. Alternatively, the relay UE may also add, remove and/or format the content of the first discovery request to obtain the second discovery request, and broadcast the second discovery request. For example, the relay UE adds a device identification of the relay UE in the first discovery request, to obtain the second discovery request.

At S1302C, the second UE sends a second discovery response to the relay UE. The second information is carried in the second discovery response.

After the second UE detects the second discovery request of the relay UE, if determining that the second UE communicates with the first UE by means of the relay UE, for example, if the second UE also needs a relay service indicated by a discovery request, the second UE may send the second discovery response to the relay UE, so as to respond the second discovery request of the relay UE. When the second UE returns the second discovery response back to the relay UE, the second information may be carried in the second discovery response.

At S1304C, the relay UE sends a first discovery response to the first UE. The first information is carried in the first discovery response.

The relay UE receives the second discovery response, so as to obtain the second information through parsing, then determines the first information based on the second information and the relay mode(s) corresponding to the relay UE, and returns the first information back to the first UE by carrying the first information in the first discovery response, so as to respond to the first discovery request of the first UE.

At S1306, the first UE determines the first relay mode based on the second relay mode and the relay mode(s) corresponding to the first UE.

Next, the technical solution of determining the first relay mode by the second UE is introduced and described.

Figure 17:
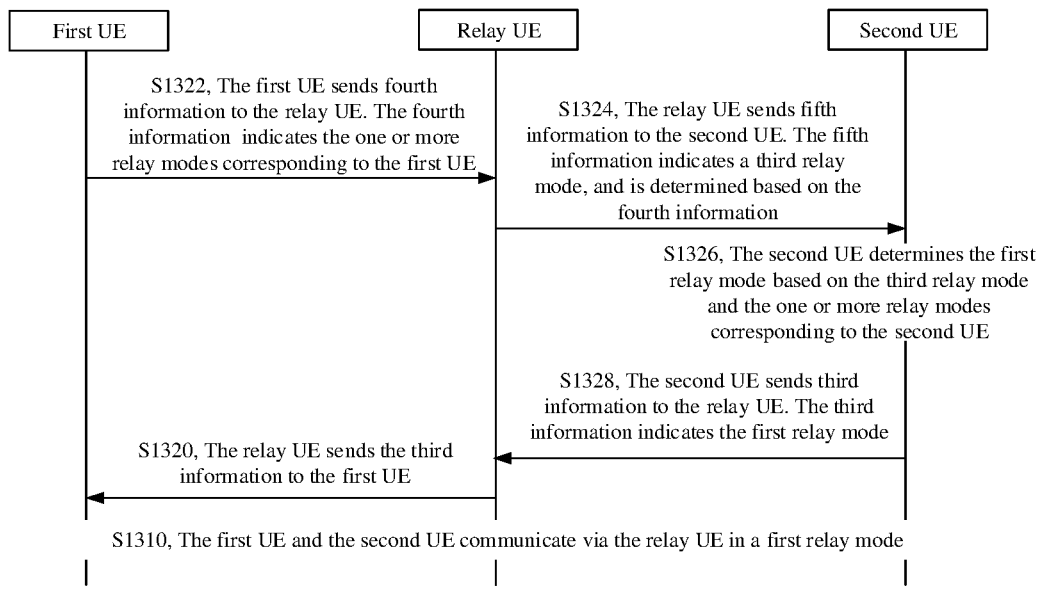
FIG. 17 is a flowchart of a relay communication method according to yet another embodiment of the present disclosure.

In a possible implementation, as shown in FIG. 17, before S1310, the method further includes the following steps.

At S1322, the first UE sends fourth information to the relay UE. The fourth information indicates the one or more relay modes corresponding to one or more relay modes corresponding to the first UE.

In this implementation, the second UE determines the first relay mode is, such that the first UE needs to send the one or more relay modes corresponding to one or more relay modes corresponding to the first UE to the second UE. Since the first UE and the second UE cannot establish a direct communication by means of the PC5 interface, the first UE needs to relay by means of the relay UE, so as to achieve the purpose of information interaction with the second UE.

Based on this, the first UE sends the fourth information to the relay UE. The fourth information indicates the one or more relay modes corresponding to one or more relay modes corresponding to the first UE. For a specific sending mode of the fourth information, refer to the following embodiments, details are not described herein again. The method for indicating the one or more relay modes corresponding to one or more relay modes corresponding to the first UE is not limited in this embodiment of the present disclosure. In an example, the relay mode(s) corresponding to the first UE is clearly indicated in the fourth information, for example, the fourth information includes a parameter configuration of the one or more relay modes corresponding to one or more relay modes corresponding to the first UE. In another example, the one or more relay modes corresponding to one or more relay modes corresponding to the first UE are implicitly indicated in the fourth information, for example, the fourth information includes an RSC(s) corresponding to the one or more relay modes corresponding to one or more relay modes corresponding to the first UE. Insofar as the fourth information includes the RSC(s) corresponding to the one or more relay modes corresponding to one or more relay modes corresponding to the first UE, the core network device may configure the same mapping relationship between relay modes and RSCs for each UE in advance. A specific configuration process may refer to the embodiments corresponding to FIG. 10 to FIG. 12, which is not described herein again.

At S1324, the relay UE sends fifth information to the second UE. The fifth information indicates a third relay mode, and is determined based on the fourth information.

Since the first relay mode is the relay mode that is used by all UEs, the relay UE also needs to send the one or more relay modes corresponding to one or more relay modes corresponding to the relay UE to the second UE. In this implementation, after receiving the fourth information from the first UE, the relay UE determines the fifth information based on the fourth information and the one or more relay modes corresponding to one or more relay modes corresponding to the relay UE, and sends the fifth information to the second UE, so as to notify the second UE of the relay modes corresponding to the relay UE and the first UE.

The fifth information sent by the relay UE indicates the third relay mode. In an example, the third relay mode includes: the relay mode(s) corresponding to the relay UE and the relay mode(s) corresponding to the first UE. Exemplarily, after receiving the fourth information from the first UE, the relay UE directly adds an indication of the one or more relay modes corresponding to one or more relay modes corresponding to the relay UE based on the fourth information, so as to obtain the fifth information, and sends the fifth information to the second UE. In another example, the third relay mode includes a relay mode common to the relay mode(s) corresponding to the relay UE and the relay mode(s) corresponding to the first UE. Exemplarily, after receiving the fourth information from the first UE, the relay UE determines the common relay mode of the first UE and the relay UE based on the relay mode(s) corresponding to the first UE indicated by the fourth information and the relay mode(s) corresponding to the relay UE, then obtains the fifth information based on the indication of the common relay mode, and sends the fifth information to the second UE.

The method for indicating the third relay mode is not limited in this embodiment of the present disclosure. In an example, the third relay mode is clearly indicated in the fifth information, for example, the fifth information includes a parameter configuration corresponding to the third relay mode. In another example, the third relay mode is implicitly indicated in the fifth information, for example, the fifth information includes an RSC corresponding to the third relay mode. Insofar as the fifth information includes the RSC corresponding to the third relay mode, the core network device may configure the same mapping relationship between relay modes and RSCs for each UE in advance. A specific configuration process may refer to the embodiments corresponding to FIG. 10 to FIG. 12, which is not described herein again. Since the relay UE may establish a direct communication with a plurality of first UEs by means of the PC5 interface, the relay UE may receive the fourth information from the plurality of first UEs. In order to enable the second UE to learn the one or more relay modes corresponding to one or more relay modes corresponding to each first UE, so as to facilitate the second UE to select the appropriate first UE for relay communication from the plurality of first UEs, optionally, the fifth information further includes identification information of the first UE. The identification information of the first UE is used for identifying the first UE.

At S1326, the second UE determines the first relay mode based on the third relay mode and the one or more relay modes corresponding to one or more relay modes corresponding to the second UE.

After receiving the fifth information from the relay UE, the second UE may determine the third relay mode indicated by the fifth information, and determine, based on the third relay mode and the one or more relay modes corresponding to one or more relay modes corresponding to the second UE, the first relay mode used during relay communication. Optionally, the second UE determines the relay mode common to the third relay mode and the one or more relay modes corresponding to one or more relay modes corresponding to the second UE as the first relay mode.

At S1328, the second UE sends third information to the relay UE. The third information indicates the first relay mode.

After determining the first relay mode, the second UE may indicate the first relay mode to the first UE, such that the first UE subsequently communicates with the second UE by means of the relay UE based on the first relay mode. Since the second UE and the first UE cannot establish a direct communication by means of the PC5 interface, the second UE needs to send the third information to the relay UE, and then forwards the third information from the relay UE to the first UE.

The third information indicates the first relay mode. The method for indicating the first relay mode is not limited in this embodiment of the present disclosure. In an example, the first relay mode is clearly indicated in the third information, for example, the third information includes a parameter configuration of the first relay mode. In another example, the first relay mode is implicitly indicated in the third information, for example, the third information includes an RSC corresponding to the first relay mode. Insofar as the third information includes the RSC corresponding to the first relay mode, the core network device may configure the same mapping relationship between relay modes and RSCs for each UE in advance. The specific configuration process may refer to the embodiments corresponding to FIG. 10 to FIG. 12, which is not described herein again.

At S1320, the relay UE sends the third information to the first UE.

After receiving the third information from the second UE, the relay UE may forward the third information to the first UE, so as to indicate the first relay mode.

The mode of sending information is introduced and described below.

Figure 18:
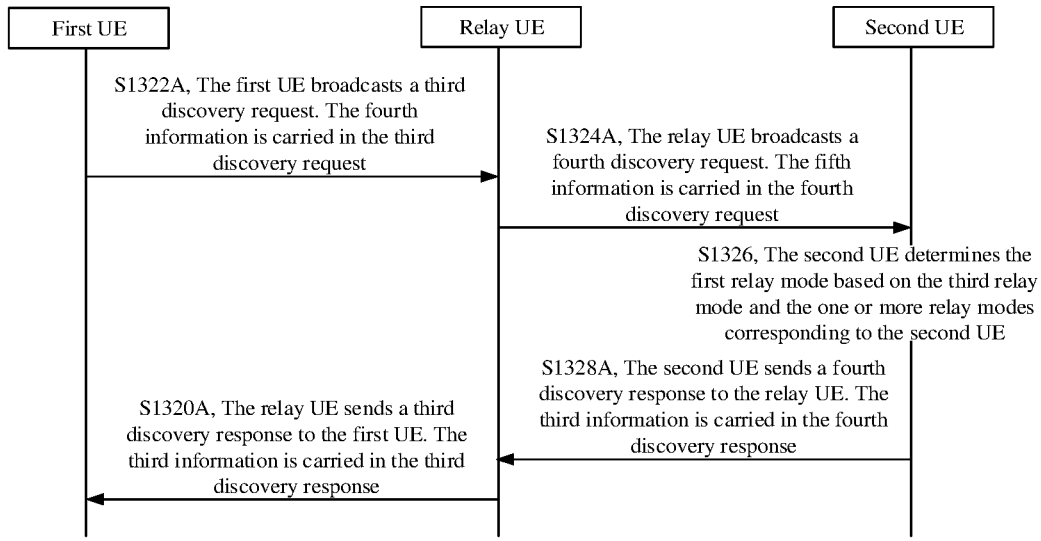
FIG. 18 is a flowchart of a relay mode determination method according to yet another embodiment of the present disclosure.

In an example, as shown in FIGS. 18, S1322 to S1320 are respectively implemented as the following steps (S1322 is implemented as S1322A, S1324 is implemented as S1324A, S1326 is implemented as S1326, S1328 is implemented as 1328A, and S1320 is implemented as 1320A).

At S1322A, the first UE broadcasts a third discovery request. The fourth information is carried in the third discovery request.

The first UE may broadcast the third discovery request during device discovery, and the third discovery request is used for requesting discovery of the relay UE and the second UE for a corresponding relay service. Since the first UE needs to indicate, to the second UE, the one or more relay modes corresponding to one or more relay modes corresponding to the first UE, the first UE may carry the fourth information in the third discovery request. The fourth information indicates the one or more relay modes corresponding to one or more relay modes corresponding to the first UE.

At S1324A, the relay UE broadcasts a fourth discovery request. The fifth information is carried in the fourth discovery request.

The relay UE may receive the fourth information when detecting the third discovery request of the first UE, then determines the fifth information based on the fourth information and the one or more relay modes corresponding to one or more relay modes corresponding to the relay UE, and broadcasts the fifth information by carrying the fifth information in the fourth discovery request.

At S1326, the second UE determines the first relay mode based on the third relay mode and the one or more relay modes corresponding to one or more relay modes corresponding to the second UE.

The second UE receives the fifth information when detecting the fourth discovery request of the relay UE, such that the second UE determines the first relay mode based on the third relay mode indicated by the fifth information and the one or more relay modes corresponding to one or more relay modes corresponding to the second UE.

At S1328A, the second UE sends a fourth discovery response to the relay UE. The third information is carried in the fourth discovery response.

The second UE carries the third information indicating the first relay mode in the fourth discovery response, and returns the fourth discovery response back to the relay UE, in response to the fourth discovery request of the relay UE.

At S1320A, the relay UE sends a third discovery response to the first UE. The third information is carried in the third discovery response.

After receiving the fourth discovery response from the second UE, the relay UE sends the third discovery response carrying the third information to the first UE, in response to the third discovery request of the first UE. Optionally, the relay UE directly forwards the fourth discovery response to the first UE. That is to say, the fourth discovery response and the third discovery response have the same content. Alternatively, the relay UE adds, reduces and/or formats the content of the fourth discovery response to get the third discovery response, and sends the third discovery response to the first UE.

Figure 19:
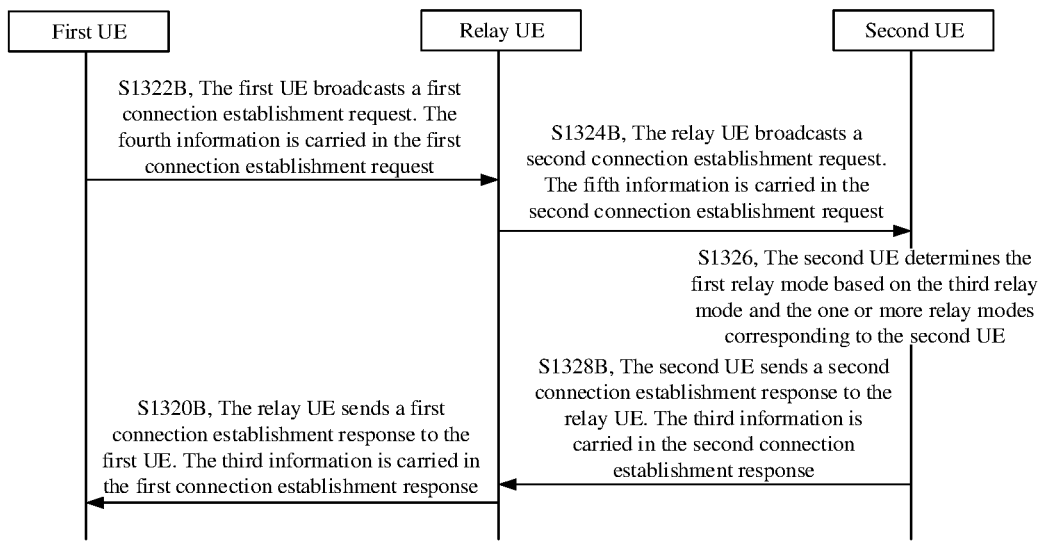
FIG. 19 is a flowchart of a relay mode determination method according to still another embodiment of the present disclosure.

In another example, as shown in FIGS. 19, S1322 to S1320 are respectively implemented as the following steps (S1322 is implemented as S1322B, S1324 is implemented as S1324B, S1326 is implemented as S1326, S1328 is implemented as 1328B, and S1320 is implemented as 1320B).

At S1322B, the first UE broadcasts a first connection establishment request. The fourth information is carried in the first connection establishment request.

In an actual application, the first UE may not execute a device discovery process, but directly initiates the establishment of the connection. When the first UE directly initiates the establishment of the connection, the first UE may broadcast the first connection establishment request. Since the first relay mode is determined by the second UE, the first UE needs to indicate, to the second UE, the one or more relay modes corresponding to one or more relay modes corresponding to the first UE, such that the first UE may carry the fourth information in the broadcast first connection establishment request. The fourth information indicates the one or more relay modes corresponding to one or more relay modes corresponding to the first UE.

At S1324B, the relay UE broadcasts a second connection establishment request. The fifth information is carried in the second connection establishment request.

The relay UE may obtain the fourth information by parsing when detecting the first connection establishment request from the first UE, then may determine the third relay mode based on the one or more relay modes corresponding to one or more relay modes corresponding to the first UE indicated by the fourth information, and broadcasts the fifth information by carrying the fifth information indicating the third relay mode in the second connection establishment request.

At S1326, the second UE determines the first relay mode based on the third relay mode and the one or more relay modes corresponding to one or more relay modes corresponding to the second UE.

The second UE may obtain the fifth information by parsing when detecting the second connection establishment request from the relay UE, and then may determine the first relay mode based on the third relay mode indicated by the fifth information and the one or more relay modes corresponding to one or more relay modes corresponding to the second UE.

At S1328B, the second UE sends a second connection establishment response to the relay UE. The third information is carried in the second connection establishment response.

The second UE carries the third information indicating the first relay mode in the second connection establishment response, and returns the second connection establishment response back to the relay UE, in response to the second connection establishment request of the relay UE.

At S1320B, the relay UE sends a first connection establishment response to the first UE. The third information is carried in the first connection establishment response.

After receiving the second connection establishment response from the second UE, the relay UE sends the first connection establishment response carrying the third information to the first UE, in response to the first connection establishment request of the first UE. Optionally, the relay UE directly forwards the second connection establishment response to the first UE. That is to say, the first connection establishment response and the second connection establishment response have the same content. Alternatively, the relay UE adds, reduces and/or formats the content of the second connection establishment response to get the first connection establishment response, and sends the first connection establishment response to the first UE.

It is to be noted that, according to the embodiments corresponding to FIG. 13 to FIG. 19, the relay communication method provided in the embodiments of the present disclosure is described from the perspective of interaction among the first UE, the relay UE and the second UE. The steps executed by the first UE may be implemented separately as the relay communication method on a first UE side; the steps executed by the relay UE may be implemented separately as the relay communication method on a relay UE side; and the steps executed by the second UE may be implemented separately as the relay communication method on a second UE side.

The following is the apparatus embodiments of the present disclosure, which may be used to execute the method embodiments of the present disclosure. For details that are not disclosed in the apparatus embodiments of the present disclosure, the method embodiments of the present disclosure may be referred to.

Figure 20:
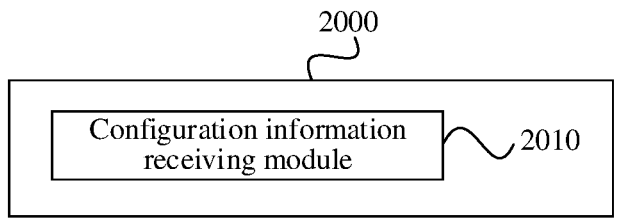
FIG. 20 is a block diagram of an apparatus for configuring a relay mode according to an embodiment of the present disclosure.

FIG. 20 is a block diagram of an apparatus for configuring a relay mode according to an embodiment of the present disclosure. The apparatus has the functions of implementing the above method examples on a UE side, and the functions may be implemented by means of hardware or by executing corresponding software by means of hardware. The apparatus may be the UE introduced in the embodiment in FIG. 1, or may be disposed in the UE. As shown in FIG. 20, the apparatus 2000 may include a configuration information receiving module 2010.

The configuration information receiving module 2010 is configured to receive first configuration information from a core network device. The first configuration information includes at least one relay mode configured for the UE by the core network device, and the UE is a device having a Prose capability.

In an example, the first configuration information further includes at least one RSC, each corresponding to a respective one of the at least one relay mode.

Figure 21:
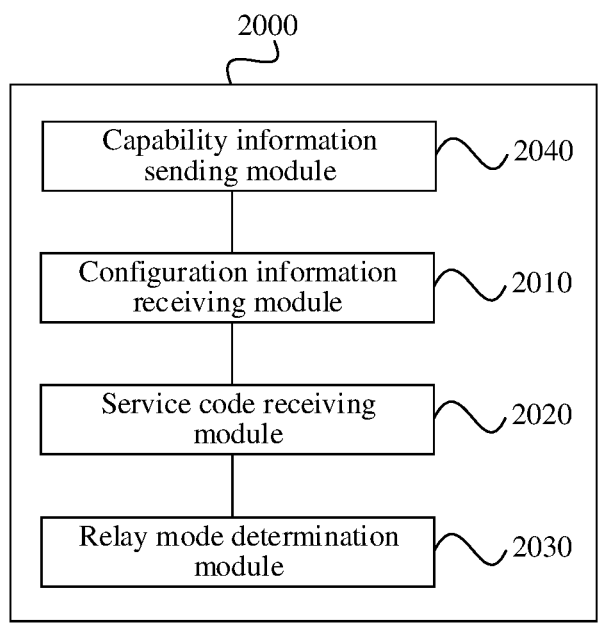
FIG. 21 is a block diagram of an apparatus for configuring a relay mode according to another embodiment of the present disclosure.

In an example, as shown in FIG. 21, the apparatus 2000 further includes: a service code receiving module 2020, configured to receive a first RSC from other UE(s); and a relay mode determination module 2030, configured to determine a relay mode of the other UE(s) corresponding to the first RSC based on the first configuration information.

In an example, the first configuration information further includes use condition information corresponding to the at least one relay mode respectively.

In an example, the use condition information includes at least one of the following: time information, area information, or service information.

In an example, the area information includes at least one of the following: an identification corresponding to a PLMN, an identification corresponding to TA, or an identification corresponding to a geographical area.

In an example, the at least one relay mode includes at least one of the following: a layer 3-based relay mode, or a layer 2-based relay mode.

In an example, the first configuration information is carried in Prose configuration information; or the first configuration information is carried in URSP configuration information.

In an example, as shown in FIG. 21, the apparatus 2000 further includes: a capability information sending module 2040, configured to send relay capability information to the core network device. The relay capability information includes one or more relay modes supported by the UE.

In an example, the relay mode supported by the UE includes at least one of the following: a layer 3-based relay mode, or a layer 2-based relay mode.

In an example, the at least one relay mode is included in the one or more relay modes supported by the UE.

In an example, the UE is a UE providing a relay service; or the UE is a UE using the relay service.

In an example, the core network device configures a same mapping relationship between relay modes and RSCs for a plurality of UEs.

To sum up, according to the technical solutions provided in the embodiments of the present disclosure, the core network device configures the relay mode for the UE with the Prose capability, such that the UE can learn the connection mode of the relay communication, thereby ensuring that the UE can perform the relay communication. Furthermore, when configuring the relay mode for the UE with the Prose capability, the core network device may further configure the RSC corresponding to the relay mode for the UE, such that, the UE may determine, based on the configuration information sent by the core network device, not only the relay mode corresponding to the RSC, but also the RSC corresponding to the relay mode. In addition, the core network device configures the same mapping relationship between relay modes and RSCs for the plurality of UEs, such that when receiving the RSC(s) from other UE(s) during the subsequent relay communication, the UE may determine, based on the configuration information sent by the core network device, the relay mode(s) of the other UE(s) corresponding to the RSC(s), so as to facilitate the UE to use the same relay mode as the other UE(s), thereby guaranteeing the normal proceeding of the relay communication.

Figure 22:
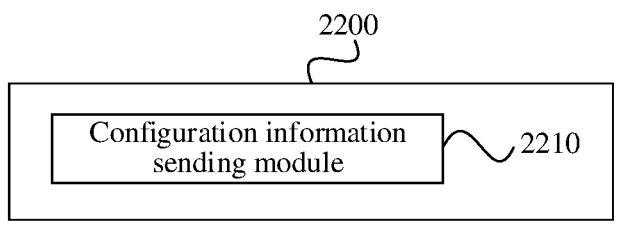
FIG. 22 is a block diagram of an apparatus for configuring a relay mode according to still another embodiment of the present disclosure.

FIG. 22 is a block diagram of an apparatus for configuring a relay mode according to an embodiment of the present disclosure. The apparatus has the function of implementing the above method examples on a core network device side, and the function may be implemented by means of hardware or by executing corresponding software by means of hardware. The apparatus may be the core network device introduced in the embodiment in FIG. 1, or may be disposed in the core network device. As shown in FIG. 22, the apparatus 2200 may include a configuration information sending module 2210.

The configuration information sending module 2210 is configured to send first configuration information to a UE. The first configuration information includes at least one relay mode configured for the UE by the core network device, and the UE is a device having a Prose capability.

In an example, the first configuration information further includes at least one RSC, each corresponding to a respective one of the at least one relay mode.

In an example, the first configuration information further includes use condition information corresponding to the at least one relay mode respectively.

In an example, the use condition information includes at least one of the following: time information, area information, or service information.

In an example, the area information includes at least one of the following: an identification corresponding to a PLMN, an identification corresponding to TA, or an identification corresponding to a geographical area.

In an example, the at least one relay mode includes at least one of the following: a layer 3-based relay mode, or a layer 2-based relay mode.

In an example, the first configuration information is carried in Prose configuration information; or the first configuration information is carried in URSP configuration information.

Figure 23:
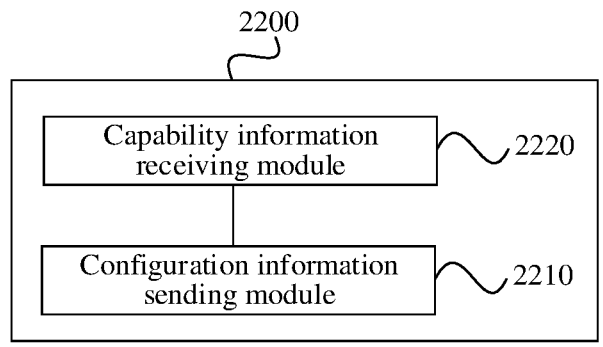
FIG. 23 is a block diagram of an apparatus for configuring a relay mode according to yet another embodiment of the present disclosure.

In an example, as shown in FIG. 23, the apparatus 2200 further includes: a capability information receiving module 2220, configured to receive relay capability information from a UE. The relay capability information includes one or more relay modes supported by the UE.

In an example, the relay mode supported by the UE includes at least one of the following: a layer 3-based relay mode, or a layer 2-based relay mode.

In an example, the at least one relay mode is included in the one or more relay modes supported by the UE.

In an example, the UE is a UE providing a relay service; or the UE is a UE using the relay service.

In an example, the core network device configures a same mapping relationship between relay modes and RSCs for a plurality of UEs.

To sum up, according to the technical solutions provided in the embodiments of the present disclosure, the core network device configures the relay mode for the UE with the Prose capability, such that the UE can learn the connection mode of the relay communication, thereby ensuring that the UE can perform the relay communication. Furthermore, when configuring the relay mode for the UE with the Prose capability, the core network device may further configure the RSC corresponding to the relay mode for the UE, such that, the UE may determine, based on the configuration information sent by the core network device, not only the relay mode corresponding to the RSC, but also the RSC corresponding to the relay mode. In addition, the core network device configures the same mapping relationship between relay modes and RSCs for the plurality of UEs, such that when receiving the RSC(s) from other UE(s) during the subsequent relay communication, the UE may determine, based on the configuration information sent by the core network device, the relay mode of the other UE(s) corresponding to the RSC, so as to cause the UE to use the same relay mode as the other UE(s), thereby guaranteeing the normal proceeding of the relay communication.

Figure 24:
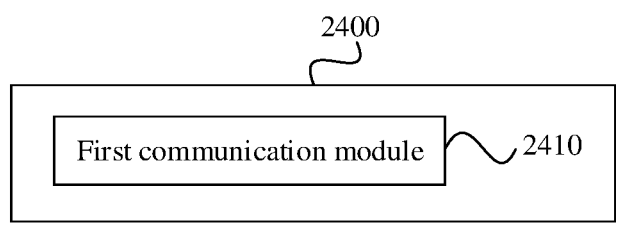
FIG. 24 is a block diagram of a relay communication apparatus according to an embodiment of the present disclosure.

FIG. 24 is a block diagram of a relay communication apparatus according to an embodiment of the present disclosure. The apparatus has the functions of implementing the above method examples on a first UE side, and the functions may be implemented by means of hardware or by executing corresponding software by means of hardware. The apparatus may be a first UE introduced in the embodiment in FIG. 7, or may be disposed in the first UE. As shown in FIG. 24, the apparatus 2400 may include a first communication module 2410.

The first communication module 2410 is configured to perform a communication with a second UE by means of a relay UE based on a first relay mode. The first relay mode is included in one or more relay modes corresponding to the first UE; the first relay mode is included in one or more relay modes corresponding to the relay UE; and the first relay mode is included in one or more relay modes corresponding to the second UE.

Figure 25:
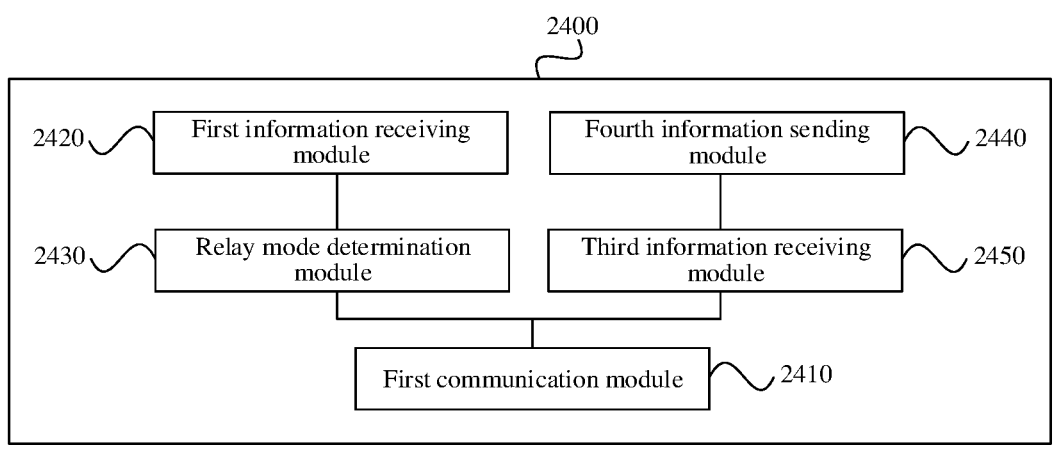
FIG. 25 is a block diagram of a relay communication apparatus according to another embodiment of the present disclosure.

In an example, as shown in FIG. 25, the apparatus 2400 further includes: a first information receiving module 2420, configured to receive first information from the relay UE, where the first information indicates a second relay mode; and a relay mode determination module 2430, configured to determine the first relay mode based on the second relay mode and the one or more relay modes corresponding to one or more relay modes corresponding to first UE.

In an example, the second relay mode includes: the one or more relay modes corresponding to one or more relay modes corresponding to the relay UE and the one or more relay modes corresponding to one or more relay modes corresponding to the second UE.

In an example, the second relay mode includes a relay mode common to the one or more relay modes corresponding to one or more relay modes corresponding to the relay UE and the one or more relay modes corresponding to one or more relay modes corresponding to the second UE.

In an example, the first information further includes identification information of the second UE; and the identification information of the second UE is used for identifying the second UE.

In an example, as shown in FIG. 25, the first information receiving module 2420 is configured to receive first broadcast information from the relay UE. The first information is carried in the first broadcast information.

In an example, as shown in FIG. 25, the first information receiving module 2420 is configured to broadcast a first discovery request; and receive a first discovery response from the relay UE. The first information is carried in the first discovery response.

In an example, the first information includes an RSC corresponding to the second relay mode.

In an example, as shown in FIG. 25, the apparatus 2400 further includes: a fourth information sending module 2440, configured to send fourth information to the relay UE, where the fourth information indicates the one or more relay modes corresponding to one or more relay modes corresponding to first UE; and a third information receiving module 2450, configured to receive third information from the relay UE. The third information indicates the first relay mode.

In an example, as shown in FIG. 25, the fourth information sending module 2440 is configured to broadcast a third discovery request. The fourth information is carried in the third discovery request. The third information receiving module 2450 is configured to receive a third discovery response from the relay UE. The third information is carried in the third discovery response.

In an example, as shown in FIG. 25, the fourth information sending module 2440 is configured to broadcast a first connection establishment request. The fourth information is carried in the first connection establishment request. The third information receiving module 2450 is configured to receive a first connection establishment response from the relay UE. The third information is carried in the first connection establishment response.

In an example, the fourth information includes an RSC(s) corresponding to the one or more relay modes corresponding to one or more relay modes corresponding to the first UE; and the third information includes an RSC corresponding to the first relay mode.

In an example, the one or more relay modes corresponding to one or more relay modes corresponding to the first UE include at least one of the following: a layer 3-based relay mode, or a layer 2-based relay mode. The one or more relay modes corresponding to one or more relay modes corresponding to the relay UE include at least one of the following: a layer 3-based relay mode, or a layer 2-based relay mode. The one or more relay modes corresponding to one or more relay modes corresponding to the second UE include at least one of the following: a layer 3-based relay mode, or a layer 2-based relay mode.

In an example, the one or more relay modes corresponding to one or more relay modes corresponding to the first UE include any one of the following: a relay mode supported by the first UE, and a relay mode supported by the first UE and configured for the first UE by a core network device. The one or more relay modes corresponding to one or more relay modes corresponding to the relay UE include any one of the following: a relay mode supported by the relay UE, and a relay mode supported by the relay UE and configured for the relay UE by the core network device. The one or more relay modes corresponding to one or more relay modes corresponding to the second UE include any one of the following: a relay mode supported by the second UE, and a relay mode supported by the second UE and configured for the second UE by the core network device.

To sum up, according to the technical solutions provided in the embodiments of the present disclosure, in a relay communication system in which a plurality of UEs perform the service interaction by means of relays, the UEs use the same relay mode to perform the relay communication process, such that failure to establish the relay connection due to mismatching of the relay modes used by the UE is avoided, thereby ensuring normal proceeding of the relay communication.

Figure 26:
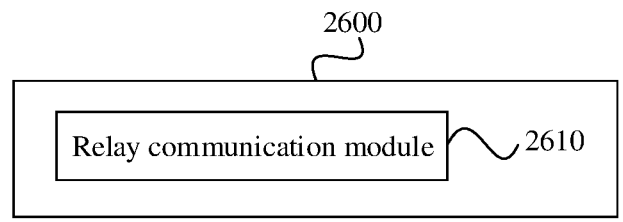
FIG. 26 is a block diagram of a relay communication apparatus according to still another embodiment of the present disclosure.

FIG. 26 is a block diagram of a relay communication apparatus according to an embodiment of the present disclosure. The apparatus has the function of implementing the above method examples on a relay UE side, and the function may be implemented by means of hardware or by executing corresponding software by means of hardware. The apparatus may be the relay UE introduced in the embodiment in FIG. 7, or may be disposed in the relay UE. As shown in FIG. 26, the apparatus 2600 may include a relay communication module 2610.

The relay communication module 2610 is configured to perform a communication between a first UE and a second UE by means of the relay UE based on a first relay mode.

The first relay mode is included in one or more relay modes corresponding to the first UE; the first relay mode is included in one or more relay modes corresponding to the relay UE; and the first relay mode is included in one or more relay modes corresponding to the second UE.

Figure 27:
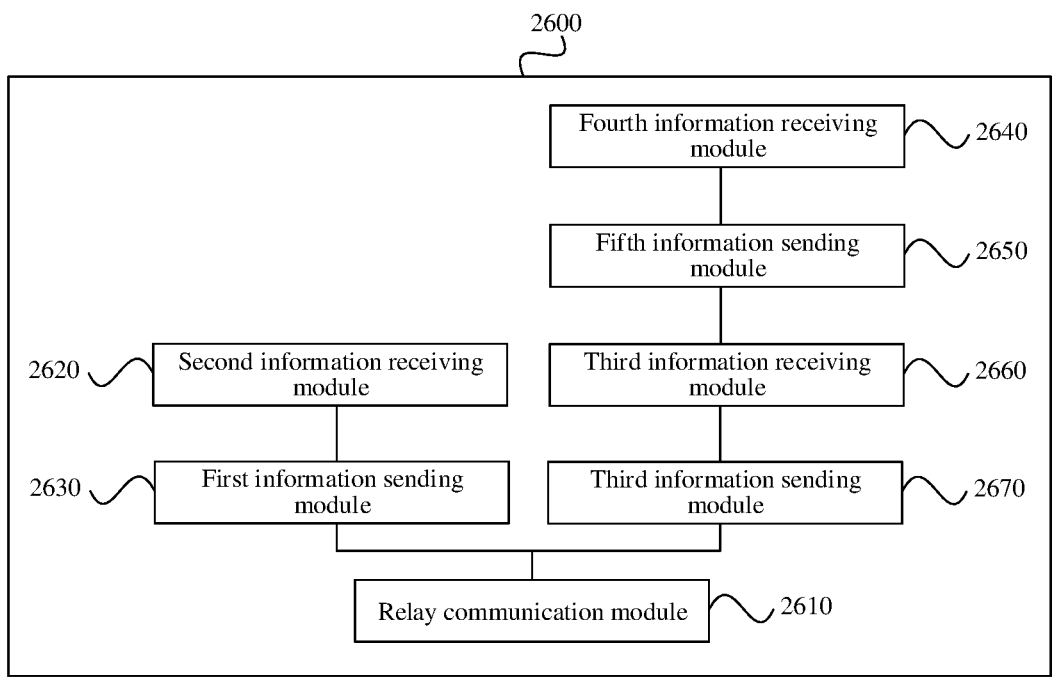
FIG. 27 is a block diagram of a relay communication apparatus according to yet another embodiment of the present disclosure.

In an example, as shown in FIG. 27, the apparatus 2600 further includes: a second information receiving module 2620, configured to receive second information from a second UE, where the second information indicates one or more relay modes corresponding to one or more relay modes corresponding to the second UE; and a first information sending module 2630, configured to send first information to a first UE. The first information indicates a second relay mode, and is determined based on the second information.

In an example, the second relay mode includes: the one or more relay modes corresponding to one or more relay modes corresponding to a relay UE and the one or more relay modes corresponding to one or more relay modes corresponding to the second UE.

In an example, the second relay mode includes a relay mode common to the one or more relay modes corresponding to one or more relay modes corresponding to the relay UE and the one or more relay modes corresponding to one or more relay modes corresponding to the second UE.

In an example, the first information further includes identification information of the second UE; and the identification information of the second UE is used for identifying the second UE.

In an example, the second information is carried in second broadcast information from the second UE; or the second information is sent to the relay UE during the process of registering the second UE to the relay UE; or the second information is sent to the relay UE during the process of establishing a connection between the second UE and the relay UE.

In an example, as shown in FIG. 27, the first information sending module 2630 is configured to broadcast first broadcast information. The first information is carried in the first broadcast information.

In an example, the second information receiving module 2620 is configured to receive a first discovery request from a first UE; broadcast a second discovery request, where the second discovery request is determined based on the first discovery request; and receive a second discovery response from a second UE. The second information is carried in the second discovery response. The first information sending module 2630 is configured to send a first discovery response to the first UE. The first information is carried in the first discovery response.

In an example, the second information includes an RSC(s) corresponding to the one or more relay modes corresponding to one or more relay modes corresponding to the second UE; and the first information includes an RSC corresponding to the second relay mode.

In an example, as shown in FIG. 27, the apparatus 2600 further includes: a fourth information receiving module 2640, configured to receive fourth information from the first UE, where the fourth information indicates the one or more relay modes corresponding to one or more relay modes corresponding to the first UE; a fifth information sending module 2650, configured to send fifth information to the second UE, where the fifth information indicates a third relay mode, and is determined based on the fourth information; a third information receiving module 2660, configured to receive third information from the second UE, where the third information indicates the first relay mode; and a third information sending module 2670, configured to send the third information to the first UE.

In an example, the third relay mode includes: the one or more relay modes corresponding to one or more relay modes corresponding to the relay UE and the one or more relay modes corresponding to one or more relay modes corresponding to the first UE.

In an example, the third relay mode includes a relay mode common to the one or more relay modes corresponding to one or more relay modes corresponding to the relay UE and the one or more relay modes corresponding to one or more relay modes corresponding to the first UE.

In an example, the fifth information further includes identification information of the first UE; and the identification information of the first UE is used for identifying the first UE.

In an example, as shown in FIG. 27, the fourth information receiving module 2640 is configured to receive a third discovery request from the first UE. The fourth information is carried in the third discovery request. The fifth information sending module 2650 is configured to broadcast a fourth discovery request. The fifth information is carried in the fourth discovery request. The third information receiving module 2660 is configured to receive a fourth discovery response from the second UE. The third information is carried in the fourth discovery response. The third information sending module 2670 is configured to send a third discovery response to the first UE. The third information is carried in the third discovery response.

In an example, as shown in FIG. 27, the fourth information receiving module 2640 is configured to receive a first connection establishment request from the first UE. The fourth information is carried in the first connection establishment request. The fifth information sending module 2650 is configured to broadcast a second connection establishment request. The fifth information is carried in the second connection establishment request. The third information receiving module 2660 is configured to receive a second connection establishment response from the second UE. The third information is carried in the second connection establishment response. The third information sending module 2670 is configured to send a first connection establishment response to the first UE. The third information is carried in the first connection establishment response.

In an example, the fourth information includes an RSC(s) corresponding to the one or more relay modes corresponding to one or more relay modes corresponding to the first UE. The fifth information includes an RSC corresponding to the third relay mode. The third information includes an RSC corresponding to the first relay mode.

In an example, the one or more relay modes corresponding to one or more relay modes corresponding to the first UE include at least one of the following: a layer 3-based relay mode, or a layer 2-based relay mode. The one or more relay modes corresponding to one or more relay modes corresponding to the relay UE include at least one of the following: a layer 3-based relay mode, or a layer 2-based relay mode. The one or more relay modes corresponding to one or more relay modes corresponding to the second UE include at least one of the following: a layer 3-based relay mode, or a layer 2-based relay mode.

In an example, the one or more relay modes corresponding to one or more relay modes corresponding to the first UE include any one of the following: a relay mode supported by the first UE, and a relay mode supported by the first UE and configured for the first UE by a core network device. The one or more relay modes corresponding to one or more relay modes corresponding to the relay UE include any one of the following: a relay mode supported by the relay UE, and a relay mode supported by the relay UE and configured for the relay UE by the core network device. The one or more relay modes corresponding to one or more relay modes corresponding to the second UE include any one of the following: a relay mode supported by the second UE, and a relay mode supported by the second UE and configured for the second UE by the core network device.

To sum up, according to the technical solutions provided in the embodiments of the present disclosure, in a relay communication system in which a plurality of UEs perform the service interaction by means of relays, the UEs use the same relay mode to perform the relay communication process, such that failure to establish the relay connection due to mismatching of the relay modes used by the UE is avoided, thereby ensuring normal proceeding of the relay communication.

Figure 28:
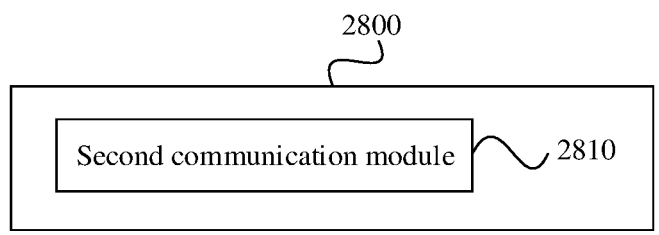
FIG. 28 is a block diagram of a relay communication apparatus according to yet still another embodiment of the present disclosure.

FIG. 28 is a block diagram of a relay communication apparatus according to an embodiment of the present disclosure. The apparatus has the functions of implementing the above method examples on a second UE side, and the functions may be implemented by means of hardware or by executing corresponding software by means of hardware. The apparatus may be the second UE introduced in the embodiment in FIG. 7, or may be disposed in the second UE. As shown in FIG. 28, the apparatus 2800 may include a second communication module 2810.

The second communication module 2810 is configured to perform a communication with a first UE by means of a relay UE based on a first relay mode.

The first relay mode is included in one or more relay modes corresponding to the first UE; the first relay mode is included in one or more relay modes corresponding to the relay UE; and the first relay mode is included in one or more relay modes corresponding to the second UE.

Figure 29:
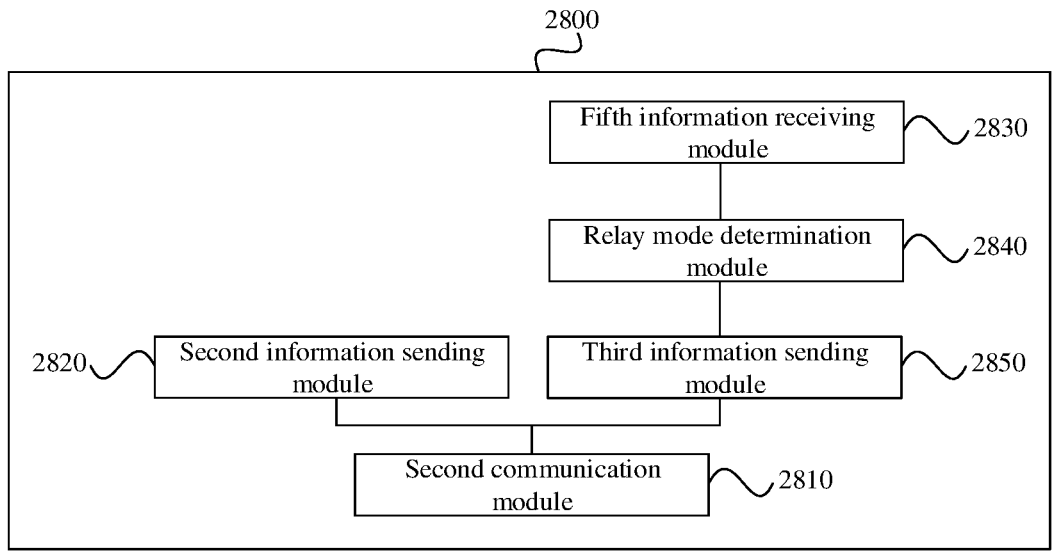
FIG. 29 is a block diagram of a relay communication apparatus according to yet still another embodiment of the present disclosure.

In an example, as shown in FIG. 29, the apparatus 2800 further includes: a second information sending module 2820, configured to send second information to a relay UE. The second information indicates the one or more relay modes corresponding to one or more relay modes corresponding to a second UE.

In an example, as shown in FIG. 29, the second information sending module 2820 is configured to: broadcast second broadcast information, where the second information is carried in the second broadcast information; or send the second information to the relay UE during the process of registering the second UE to the relay UE; or send the second information to the relay UE during the process of establishing a connection between the second UE and the relay UE.

In an example, as shown in FIG. 29, the second information sending module 2820 is configured to receive a second discovery request from the relay UE; and send a second discovery response to the relay UE. The second information is carried in the second discovery response.

In an example, the second information includes an RSC(s) corresponding to the one or more relay modes corresponding to one or more relay modes corresponding to the second UE.

In an example, as shown in FIG. 29, the apparatus 2800 further includes: a fifth information receiving module 2830, configured to receive fifth information from the relay UE, where the fifth information indicates a third relay mode; a relay mode determination module 2840, configured to determine the first relay mode based on the third relay mode and the one or more relay modes corresponding to one or more relay modes corresponding to the second UE; and a third information sending module 2850, configured to send third information to the relay UE. The third information indicates the first relay mode.

In an example, the third relay mode includes: the one or more relay modes corresponding to one or more relay modes corresponding to the relay UE and the one or more relay modes corresponding to one or more relay modes corresponding to first UE.

In an example, the third relay mode includes a relay mode common to the one or more relay modes corresponding to one or more relay modes corresponding to the relay UE and the one or more relay modes corresponding to one or more relay modes corresponding to the first UE.

In an example, the fifth information further includes identification information of the first UE; and the identification information of the first UE is used for identifying the first UE.

In an example, as shown in FIG. 29, the fifth information receiving module 2830 is configured to receive a fourth discovery request from the relay UE. The fifth information is carried in the fourth discovery response. The third information sending module 2850 is configured to send a fourth discovery response to the relay UE. The third information is carried in the fourth discovery response.

In an example, as shown in FIG. 29, the fifth information receiving module 2830 is configured to receive a second connection establishment request from the relay UE. The fifth information is carried in the second connection establishment request. The third information sending module 2850 is configured to send a second connection establishment response to the relay UE. The third information is carried in the second connection establishment response.

In an example, the fifth information includes an RSC corresponding to the third relay mode; and the third information includes an RSC corresponding to the first relay mode.

In an example, the one or more relay modes corresponding to one or more relay modes corresponding to the first UE include at least one of the following: a layer 3-based relay mode, or a layer 2-based relay mode. The one or more relay modes corresponding to one or more relay modes corresponding to the relay UE include at least one of the following: a layer 3-based relay mode, or a layer 2-based relay mode. The one or more relay modes corresponding to one or more relay modes corresponding to the second UE include at least one of the following: a layer 3-based relay mode, or a layer 2-based relay mode.

In an example, the one or more relay modes corresponding to one or more relay modes corresponding to the first UE include any one of the following: a relay mode supported by the first UE, and a relay mode supported by the first UE and configured for the first UE by a core network device. The one or more relay modes corresponding to one or more relay modes corresponding to the relay UE include any one of the following: a relay mode supported by the relay UE, and a relay mode supported by the relay UE and configured for the relay UE by the core network device. The one or more relay modes corresponding to one or more relay modes corresponding to the second UE include any one of the following: a relay mode supported by the second UE, and a relay mode supported by the second UE and configured for the second UE by the core network device.

To sum up, according to the technical solutions provided in the embodiments of the present disclosure, in a relay communication system in which a plurality of UEs perform the service interaction by means of relays, the UEs use the same relay mode to perform the relay communication process, such that failure to establish the relay connection due to mismatching of the relay modes used by the UE is avoided, thereby ensuring normal proceeding of the relay communication.

It is to be noted that, when the apparatus provided in the above embodiment implements functions of the apparatus, only the division of the above functional modules is used as an example for description. In practical applications, the above function allocation can be completed by different function modules according to actual requirements. That is to say, a content structure of the device is divided into different function modules, so as to complete all or part of the functions described above.

For the apparatus in the above embodiments, the specific manner in which each module performs operations has been described in detail in the embodiments of the method, and details are not described herein again.

Figure 30:
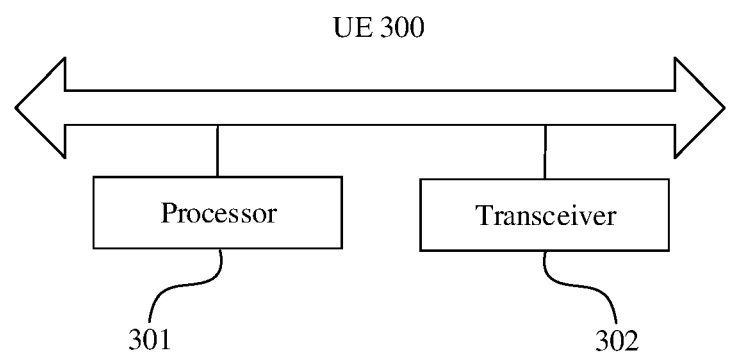
FIG. 30 is a structural block diagram of UE according to an embodiment of the present disclosure.

FIG. 30 is a structural block diagram of UE 300 according to an embodiment of the present disclosure. For example, the UE may be configured to execute the method for configuring a relay mode on a UE side. Specifically, the UE 300 may include a processor 301 and a transceiver 302 connected to the processor 301.

The processor 301 includes one or more processing cores. The processor 301 executes function applications and information processing by operating software programs and modules.

The transceiver 302 includes a receiver and a transmitter. Optionally, the transceiver 302 is a communication chip.

In an example, the UE 300 further includes a memory and a bus. The memory is connected to the processor by means of the bus. The memory may be configured to store a computer program. The processor is configured to execute the computer program, so as to implement steps in the above method embodiments that are executed by the UE.

In addition, the memory may be implemented by any type of volatile or non-volatile storage device or a combination thereof. The volatile or non-volatile storage device includes, but is not limited to, a Random-Access Memory (RAM), a Read-Only Memory (ROM), an Erasable Programmable Read-Only Memory (EPROM), an Electrically Erasable Programmable Read-Only Memory (EEPROM), a flash memory or other solid state storage technologies, a Compact Disc Read-Only Memory (CD-ROM), a Digital Video Disc (DVD), or other optical storage, tape cartridges, magnetic tape, disk storage or other magnetic storage devices.

The transceiver 302 is configured to receive first configuration information from a core network device, wherein the first configuration information comprises at least one relay mode configured for the UE by the core network device, and the UE is a device having a Prose capability.

In an example, the first configuration information further includes at least one RSC, each corresponding to a respective one of the at least one relay mode.

In an example, the transceiver 302 is configured to receive a first RSC from the other UE(s). The processor 301 is configured to determine relay mode of the other UE(s) corresponding to the first RSC based on the first configuration information.

In an example, the first configuration information further includes use condition information corresponding to the at least one relay mode respectively.

In an example, the use condition information includes at least one of the following: time information, area information, or service information.

In an example, the area information includes at least one of the following: an identification corresponding to a PLMN, an identification corresponding to TA, or an identification corresponding to a geographical area.

In an example, the at least one relay mode includes at least one of the following: a layer 3-based relay mode, or a layer 2-based relay mode.

In an example, the first configuration information is carried in Prose configuration information; or the first configuration information is carried in URSP configuration information.

In an example, the transceiver 302 is configured to send relay capability information to the core network device. The relay capability information includes a relay mode(s) supported by the UE.

In an example, the relay mode supported by the UE includes at least one of the following: a layer 3-based relay mode, or a layer 2-based relay mode.

In an example, the at least one relay mode is included in the relay mode(s) supported by the UE.

In an example, the UE is a UE providing a relay service; or the UE is a UE using the relay service.

In an example, the core network device configures a same mapping relationship between relay modes and RSCs for a plurality of UEs.

Figure 31:
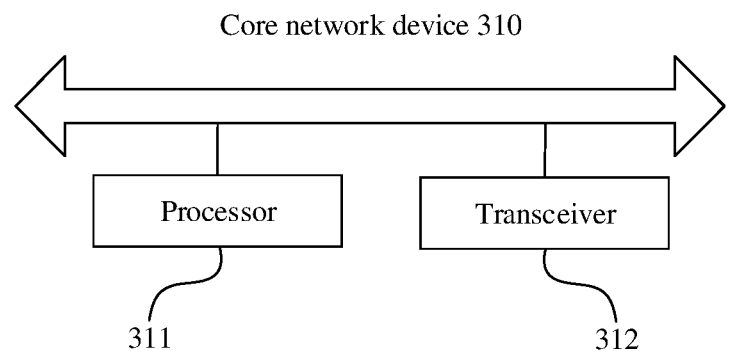
FIG. 31 is a structural block diagram of a core network device according to an embodiment of the present disclosure.

FIG. 31 is a structural block diagram of a core network device 310 according to an embodiment of the present disclosure. For example, the core network device may be configured to execute the method for configuring a relay mode on a core network device side. Specifically, the core network device 310 may include a processor 311; and a transceiver 312 connected to the processor 311.

The processor 311 includes one or more processing cores. The processor 311 executes function applications and information processing by running software programs and modules.

The transceiver 312 includes a receiver and a transmitter. Optionally, the transceiver 312 is a communication chip.

In an example, the core network device 310 further includes a memory and a bus. The memory is connected to the processor by means of the bus. The memory may be configured to store a computer program. The processor is configured to execute the computer program, to implement steps in the above method embodiments that are executed by the core network device.

In addition, the memory may be implemented by any type of volatile or non-volatile storage device or a combination thereof. The volatile or non-volatile storage device includes, but is not limited to, an RAM, an ROM, an EPROM, an EEPROM, a flash memory or other solid state storage technologies, a CD-ROM, a DVD, or other optical storage, tape cartridges, magnetic tape, disk storage or other magnetic storage devices.

The transceiver 312 is configured to send first configuration information to a UE. The first configuration information includes at least one relay mode configured for the UE by the core network device, and the UE is a device having a Prose capability.

In an example, the first configuration information further includes at least one RSC, each corresponding to a respective one of the at least one relay mode.

In an example, the first configuration information further includes use condition information corresponding to the at least one relay mode respectively.

In an example, the use condition information includes at least one of the following: time information, area information, or service information.

In an example, the area information includes at least one of the following: an identification corresponding to a PLMN, an identification corresponding to TA, or an identification corresponding to a geographical area.

In an example, the at least one relay mode includes at least one of the following: a layer 3-based relay mode, or a layer 2-based relay mode.

In an example, the first configuration information is carried in Prose configuration information; or the first configuration information is carried in URSP configuration information.

In an example, the transceiver 312 is further configured to receive relay capability information from the UE. The relay capability information includes a relay mode(s) supported by the UE.

In an example, the relay mode supported by the UE includes at least one of the following: a layer 3-based relay mode, or a layer 2-based relay mode.

In an example, the at least one relay mode is included in the relay mode(s) supported by the UE.

In an example, the UE is a UE providing a relay service; or the UE is a UE using the relay service.

In an example, the core network device configures a same mapping relationship between relay modes and RSCs for a plurality of UEs.

Figure 32:
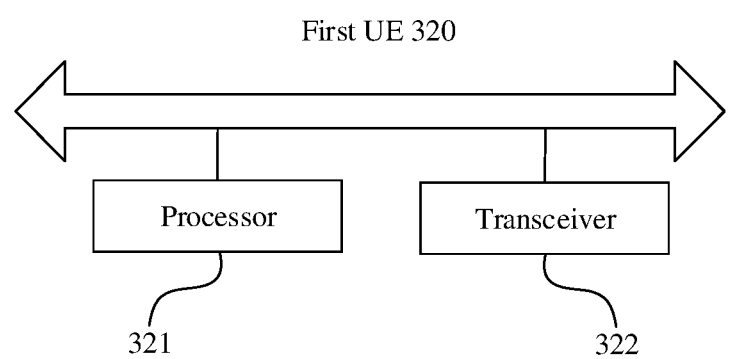
FIG. 32 is a structural block diagram of first UE according to an embodiment of the present disclosure.

FIG. 32 is a structural block diagram of first UE 320 according to an embodiment of the present disclosure. For example, the first UE may be configured to execute the relay communication method on a first UE side. Specifically, the first UE 320 may include a processor 321 and a transceiver 322 connected to the processor 321.

The processor 321 includes one or more processing cores. The processor 321 executes function applications and information processing by running software programs and modules.

The transceiver 322 includes a receiver and a transmitter. Optionally, the transceiver 322 is a communication chip.

In an example, the first UE 320 further includes a memory and a bus. The memory is connected to the processor by means of the bus. The memory may be configured to store a computer program. The processor is configured to execute the computer program, so as to implement steps in the above method embodiments that are executed by the first UE.

In addition, the memory may be implemented by any type of volatile or non-volatile storage device or a combination thereof. The volatile or non-volatile storage device includes, but is not limited to, an RAM, an ROM, an EPROM, an EEPROM, a flash memory or other solid state storage technologies, a CD-ROM, a DVD, or other optical storage, tape cartridges, magnetic tape, disk storage or other magnetic storage devices.

The transceiver 322 is configured to perform a communication with a second UE by means of a relay UE based on a first relay mode. The first relay mode is included in one or more relay modes corresponding to the first UE; the first relay mode is included in one or more relay modes corresponding to the relay UE; and the first relay mode is included in one or more relay modes corresponding to the second UE.

In an example, the transceiver 322 is configured to receive first information from the relay UE. The first information indicates a second relay mode. The processor 321 is configured to determine the first relay mode based on the second relay mode and the one or more relay modes corresponding to one or more relay modes corresponding to the first UE.

In an example, the second relay mode includes: the one or more relay modes corresponding to one or more relay modes corresponding to the relay UE and the one or more relay modes corresponding to one or more relay modes corresponding to the second UE.

In an example, the second relay mode includes a relay mode common to the one or more relay modes corresponding to one or more relay modes corresponding to the relay UE and the one or more relay modes corresponding to one or more relay modes corresponding to the second UE.

In an example, the first information further includes identification information of the second UE; and the identification information of the second UE is used for identifying the second UE.

In an example, the transceiver 322 is configured to receive first broadcast information from the relay UE. The first information is carried in the first broadcast information.

In an example, the transceiver 322 is configured to broadcast a first discovery request; and receive a first discovery response from the relay UE. The first information is carried in the first discovery response.

In an example, the first information includes an RSC corresponding to the second relay mode.

In an example, the transceiver 322 is configured to send fourth information to the relay UE. The fourth information indicates the one or more relay modes corresponding to one or more relay modes corresponding to the first UE. The transceiver 322 is configured to receive third information from the relay UE. The third information indicates the first relay mode.

In an example, the transceiver 322 is configured to broadcast a third discovery request. The fourth information is carried in the third discovery request. The transceiver 322 is configured to receive a third discovery response from the relay UE. The third information is carried in the third discovery response.

In an example, the transceiver 322 is configured to broadcast a first connection establishment request. The fourth information is carried in the first connection establishment request. The transceiver 322 is configured to receive a first connection establishment response from the relay UE. The third information is carried in the first connection establishment response.

In an example, the fourth information includes an RSC(s) corresponding to the one or more relay modes corresponding to one or more relay modes corresponding to the first UE; and the third information includes an RSC corresponding to the first relay mode.

In an example, the one or more relay modes corresponding to one or more relay modes corresponding to the first UE include at least one of the following: a layer 3-based relay mode, or a layer 2-based relay mode. The one or more relay modes corresponding to one or more relay modes corresponding to the relay UE include at least one of the following: a layer 3-based relay mode, or a layer 2-based relay mode. The one or more relay modes corresponding to one or more relay modes corresponding to the second UE include at least one of the following: a layer 3-based relay mode, or a layer 2-based relay mode.

In an example, the one or more relay modes corresponding to one or more relay modes corresponding to the first UE include any one of the following: a relay mode supported by the first UE, and a relay mode supported by the first UE and configured for the first UE by a core network device. The one or more relay modes corresponding to one or more relay modes corresponding to the relay UE include any one of the following: a relay mode supported by the relay UE, and a relay mode supported by the relay UE and configured for the relay UE by the core network device. The one or more relay modes corresponding to one or more relay modes corresponding to the second UE include any one of the following: a relay mode supported by the second UE, and a relay mode supported by the second UE and configured for the second UE by the core network device.

Figure 33:
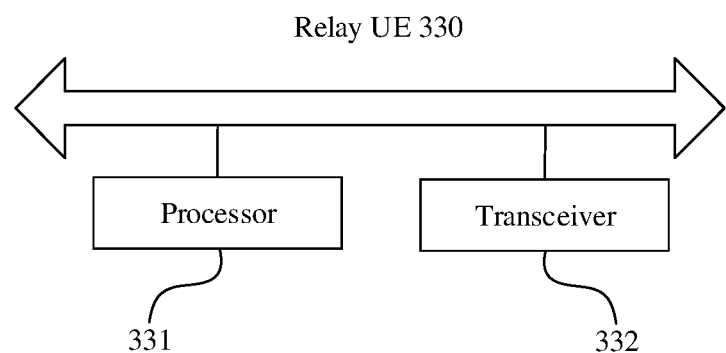
FIG. 33 is a structural block diagram of relay UE according to an embodiment of the present disclosure.

FIG. 33 is a structural block diagram of relay UE 330 according to an embodiment of the present disclosure. For example, the relay UE may be configured to execute the relay communication method on a relay UE side. Specifically, the relay UE 330 may include a processor 331 and a transceiver 332 connected to the processor 331.

The processor 331 includes one or more processing cores. The processor 331 executes function applications and information processing by running software programs and modules.

The transceiver 332 includes a receiver and a transmitter. Optionally, the transceiver 332 is a communication chip.

In an example, the relay UE 330 further includes a memory and a bus. The memory is connected to the processor by means of the bus. The memory may be configured to store a computer program. The processor is configured to execute the computer program, so as to implement steps in the above method embodiments that are executed by the relay UE.

In addition, the memory may be implemented by any type of volatile or non-volatile storage device or a combination thereof. The volatile or non-volatile storage device includes, but is not limited to, an RAM, an ROM, an EPROM, an EEPROM, a flash memory or other solid state storage technologies, a CD-ROM, a DVD, or other optical storage, tape cartridges, magnetic tape, disk storage or other magnetic storage devices.

The transceiver 332 is configured to perform a communication between a first UE and a second UE by means of a relay UE based on a first relay mode.

The first relay mode is included in one or more relay modes corresponding to the first UE; the first relay mode is included in one or more relay modes corresponding to the relay UE; and the first relay mode is included in one or more relay modes corresponding to the second UE.

In an example, the transceiver 332 is configured to receive second information from the second UE. The second information indicates one or more relay modes corresponding to one or more relay modes corresponding to the second UE. The transceiver 332 is configured to send first information to the first UE. The first information indicates a second relay mode, and is determined based on the second information.

In an example, the second relay mode includes: the one or more relay modes corresponding to the relay UE and the one or more relay modes corresponding to the second UE.

In an example, the second relay mode includes a relay mode common to the one or more relay modes corresponding to the relay UE and the one or more relay modes corresponding to the second UE.

In an example, the first information further includes identification information of the second UE; and the identification information of the second UE is used for identifying the second UE.

In an example, the second information is carried in second broadcast information from the second UE; or the second information is sent to the relay UE during the process of registering the second UE to the relay UE; or the second information is sent to the relay UE during the process of establishing a connection between the second UE and the relay UE.

In an example, the transceiver 332 is configured to broadcast first broadcast information. The first information is carried in the first broadcast information.

In an example, the transceiver 332 is configured to receive a first discovery request from the first UE; broadcast a second discovery request, where the second discovery request is determined based on the first discovery request; and receive a second discovery response from the second UE. The second information is carried in the second discovery response. The transceiver 332 is configured to send a first discovery response to the first UE. The first information is carried in the first discovery response.

In an example, the second information includes an RSC(s) corresponding to the one or more relay modes corresponding to the second UE; and the first information includes an RSC corresponding to the second relay mode.

In an example, the transceiver 332 is configured to receive fourth information from the first UE. The fourth information indicates the one or more relay modes corresponding to the first UE. The transceiver 332 is configured to send fifth information to the second UE. The fifth information indicates a third relay mode, and is determined based on the fourth information. The transceiver 322 is configured to receive third information from the second UE. The third information indicates the first relay mode. The transceiver 332 is configured to send the third information to the first UE.

In an example, the third relay mode includes: the one or more relay modes corresponding to the relay UE and the one or more relay modes corresponding to the first UE.

In an example, the third relay mode includes a relay mode common to the one or more relay modes corresponding to the relay UE and the one or more relay modes corresponding to the first UE.

In an example, the fifth information further includes identification information of the first UE; and the identification information of the first UE is used for identifying the first UE.

In an example, the transceiver 332 is configured to receive a third discovery request from the relay UE. The fourth information is carried in the third discovery request. The transceiver 332 is configured to broadcast a fourth discovery request. The fifth information is carried in the fourth discovery request. The transceiver 332 is configured to receive a fourth discovery response from the second UE. The third information is carried in the fourth discovery response. The transceiver 332 is configured to send a third discovery response to the first UE. The third information is carried in the third discovery response.

In an example, the transceiver 332 is configured to receive a first connection establishment request from the first UE. The fourth information is carried in the first connection establishment request. The transceiver 332 is configured to broadcast a second connection establishment request. The fifth information is carried in the second connection establishment request. The transceiver 332 is configured to receive a second connection establishment response from the second UE. The third information is carried in the second connection establishment response. The transceiver 332 is configured to send a first connection establishment response to the first UE. The third information is carried in the first connection establishment response.

In an example, the fourth information includes an RSC(s) corresponding to the one or more relay modes corresponding to the first UE. The fifth information includes an RSC corresponding to the third relay mode. The third information includes an RSC corresponding to the first relay mode.

In an example, the one or more relay modes corresponding to the first UE includes at least one of the following: a layer 3-based relay mode, or a layer 2-based relay mode. The one or more relay modes corresponding to the relay UE includes at least one of the following: a layer 3-based relay mode, or a layer 2-based relay mode. The one or more relay modes corresponding to the second UE includes at least one of the following: a layer 3-based relay mode, or a layer 2-based relay mode.

In an example, the one or more relay modes corresponding to the first UE includes any one of the following: a relay mode supported by the first UE, and a relay mode supported by the first UE and configured for the first UE by a core network device. The one or more relay modes corresponding to the relay UE includes any one of the following: a relay mode supported by the relay UE, and a relay mode supported by the relay UE and configured for the relay UE by the core network device. The one or more relay modes corresponding to the second UE includes any one of the following: a relay mode supported by the second UE, and a relay mode supported by the second UE and configured for the second UE by the core network device.

Figure 34:
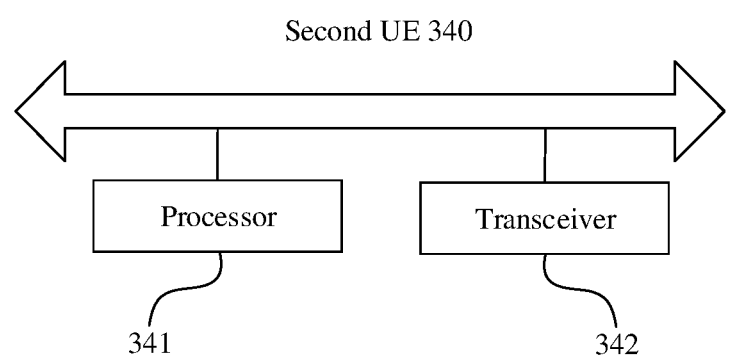
FIG. 34 is a structural block diagram of second UE according to an embodiment of the present disclosure.

FIG. 34 is a structural block diagram of second UE 340 according to an embodiment of the present disclosure. For example, the second UE may be configured to execute the relay communication method on a second UE side. Specifically, the second UE 340 may include a processor 341; and a transceiver 342 connected to the processor 341.

The processor 341 includes one or more processing cores. The processor 341 executes function applications and information processing by running software programs and modules.

The transceiver 342 includes a receiver and a transmitter. Optionally, the transceiver 342 is a communication chip.

In an example, the second UE 340 further includes a memory and a bus. The memory is connected to the processor by means of the bus. The memory may be configured to store a computer program. The processor is configured to execute the computer program, to implement steps in the above method embodiments that are executed by the second UE.

In addition, the memory may be implemented by any type of volatile or non-volatile storage device or a combination thereof. The volatile or non-volatile storage device includes, but is not limited to, an RAM, an ROM, an EPROM, an EEPROM, a flash memory or other solid state storage technologies, a CD-ROM, a DVD, or other optical storage, tape cartridges, magnetic tape, disk storage or other magnetic storage devices.

The transceiver 342 is configured to perform a communication with a first UE by means of a relay UE based on a first relay mode.

The first relay mode is included in one or more relay modes corresponding to the first UE; the first relay mode is included in one or more relay modes corresponding to the relay UE; and the first relay mode is included in one or more relay modes corresponding to the second UE.

In an example, the transceiver 342 is configured to send second information to the relay UE. The second information indicates the one or more relay modes corresponding to the second UE.

In an example, the transceiver 342 is configured to broadcast second broadcast information, where the second information is carried in the second broadcast information; or send the second information to the relay UE during a process of registering the second UE to the relay UE; or send the second information to the relay UE during a process of establishing a connection between the second UE and the relay UE.

In an example, the transceiver 342 is configured to receive a second discovery request from the relay UE; and send a second discovery response to the relay UE. The second information is carried in the second discovery response.

In an example, the second information includes an RSC(s) corresponding to the one or more relay modes corresponding to the second UE.

In an example, the transceiver 342 is configured to receive fifth information from the relay UE. The fifth information indicates a third relay mode. The processor 341 is configured to determine the first relay mode based on the third relay mode and the one or more relay modes corresponding to the second UE. The transceiver 342 is configured to send third information to the relay UE. The third information indicates the first relay mode.

In an example, the third relay mode includes: the one or more relay modes corresponding to the relay UE and the one or more relay modes corresponding to the first UE.

In an example, the third relay mode includes a relay mode common to the one or more relay modes corresponding to the relay UE and the one or more relay modes corresponding to the first UE.

In an example, the fifth information further includes identification information of the first UE; and the identification information of the first UE is used for identifying the first UE.

In an example, the transceiver 342 is configured to receive a fourth discovery request from the relay UE. The fifth information is carried in the fourth discovery response. The transceiver 342 is configured to send a fourth discovery response to the relay UE. The third information is carried in the fourth discovery response.

In an example, the transceiver 342 is configured to receive a second connection establishment request from the relay UE. The fifth information is carried in the second connection establishment request. The transceiver 342 is configured to send a second connection establishment response to the relay UE. The third information is carried in the second connection establishment response.

In an example, the fifth information includes an RSC corresponding to the third relay mode; and the third information includes an RSC corresponding to the first relay mode.

In an example, the one or more relay modes corresponding to the first UE includes at least one of the following: a layer 3-based relay mode, or a layer 2-based relay mode. The one or more relay modes corresponding to the relay UE includes at least one of the following: a layer 3-based relay mode, or a layer 2-based relay mode. The one or more relay modes corresponding to the second UE includes at least one of the following: a layer 3-based relay mode, or a layer 2-based relay mode.

In an example, the one or more relay modes corresponding to the first UE includes any one of the following: a relay mode supported by the first UE, and a relay mode supported by the first UE and configured for the first UE by a core network device. The one or more relay modes corresponding to the relay UE includes any one of the following: a relay mode supported by the relay UE, and a relay mode supported by the relay UE and configured for the relay UE by the core network device. The one or more relay modes corresponding to the second UE includes any one of the following: a relay mode supported by the second UE, and a relay mode supported by the second UE and configured for the second UE by the core network device.

An embodiment of the present disclosure further provides a computer-readable storage medium. The storage medium stores a computer program. The computer program is configured to be executed by a processor of UE, so as to implement the method for configuring a relay mode on a UE side as described above.

An embodiment of the present disclosure further provides a computer-readable storage medium. The storage medium stores a computer program. The computer program is configured to be executed by a processor of a core network device, to implement the method for configuring a relay mode on a core network device side as described above.

An embodiment of the present disclosure further provides a computer-readable storage medium. The storage medium stores a computer program. The computer program is configured to be executed by a processor of a first UE, to implement the relay communication method on a first UE side as described above.

An embodiment of the present disclosure further provides a computer-readable storage medium. The storage medium stores a computer program. The computer program is configured to be executed by a processor of a relay UE, to implement the relay communication method on a relay UE side as described above.

An embodiment of the present disclosure further provides a computer-readable storage medium. The storage medium stores a computer program. The computer program is configured to be executed by a processor of a relay UE, to implement the relay communication method on a second UE side as described above.

An embodiment of the present disclosure further provides a chip. The chip includes a programmable logic circuit and/or program instructions. The chip, when running in a UE, implements the method for configuring a relay mode on a UE side as described above.

An embodiment of the present disclosure further provides a chip. The chip includes a programmable logic circuit and/or program instructions. The chip, when running in a core network device, implements the method for configuring a relay mode on a core network device side as described above.

An embodiment of the present disclosure further provides a chip. The chip includes a programmable logic circuit and/or program instructions. The chip, when running in a first UE, implements the relay communication method on a first UE side as described above.

An embodiment of the present disclosure further provides a chip. The chip includes a programmable logic circuit and/or program instructions. The chip, when running in a relay UE, implements the relay communication method on a relay UE side as described above.

An embodiment of the present disclosure further provides a chip. The chip includes a programmable logic circuit and/or program instructions. The chip, when running in a second UE, implements the relay communication method on a second UE side as described above.

An embodiment of the present disclosure further provides a computer program product. The computer program product, when running in a UE, implements the method for configuring a relay mode on a UE side as described above.

An embodiment of the present disclosure further provides a computer program product. The computer program product, when running in a core network device, implements the method for configuring a relay mode on a core network device side as described above.

An embodiment of the present disclosure further provides a computer program product. The computer program product, when running in a first UE, implements the relay communication method on a first UE side as described above.

An embodiment of the present disclosure further provides a computer program product. The computer program product, when running in a relay UE, implements the relay communication method on a relay UE side as described above.

An embodiment of the present disclosure further provides a computer program product. The computer program product, when running in a second UE, implements the relay communication method on a second UE side as described above.

Those skilled in the art should note that, in one or more of the above examples, functions described in the embodiments of the present disclosure may be implemented by means of a combination of hardware, software, firmware, or any combination thereof. When the software is applied, these functions may be stored in the computer-readable medium or transmitted as one or more instructions or codes on the computer-readable medium. The computer-readable medium includes a computer storage medium and a communication medium. The communication medium includes any media transmitting a computer program from one place to another place. The storage medium may be any available media capable of being stored by a general or special computer.

The above are only exemplary embodiments of the present disclosure, and are not used to limit the present disclosure. Any modifications, equivalent replacements and improvements and the like made within the spirit and principle of the disclosure shall be included within the scope of protection of the present disclosure.

The invention claimed is:

1. A method of wireless communication of a first User Equipment (UE), comprising:
receiving first configuration information from a core network device,
wherein the first configuration information comprises a mapping relationship between relay modes and Relay Service Codes (RSCs) configured by the core network device, the core network device configures, for the first UE, a relay UE and a second UE, the same mapping relationship between the relay modes and the RSCs, the first configuration information further comprises at least one relay mode configured for the first UE by the core network device, and the first UE, the relay UE and the second UE are devices having a Proximity Service (Prose) capability, and
wherein the method further comprises:
receiving first information broadcasted by the relay UE, wherein the first information indicates at least one second relay mode;
determining a first relay mode based on the at least one second relay mode and the at least one relay mode configured for the first UE; and
performing a communication with the second UE by means of the relay UE based on the first relay mode.

2. The method of claim 1, wherein the at least one relay mode configured for the first UE comprises at least one a layer 3-based relay mode or a layer 2-based relay mode.

3. The method of claim 1, wherein:
the first configuration information is carried in Prose configuration information, or
the first configuration information is carried in UE Route Selection Policy (URSP) configuration information.

4. The method of claim 1, wherein before the receiving the first configuration information from a core network device, the method further comprises:
sending relay capability information to the core network device, wherein the relay capability information comprises one or more relay modes supported by the first UE.

5. The method of claim 4, wherein the one or more relay modes supported by the first UE comprises at least one of a layer 3-based relay mode or a layer 2-based relay mode.

6. The method of claim 1, wherein:
the relay UE is a UE providing a relay service, and
the first UE and the second UE are UEs using the relay service.

7. The method of claim 1, wherein the first information comprises at least one Relay Service Code (RSC) corresponding to the at least one second relay mode.

8. The method of claim 1, wherein the at least one second relay mode comprises a relay mode common to at least one relay mode configured for the relay UE and at least one relay mode configured for the second UE.

9. A first User Equipment (UE), comprising:
a processor; and
a transceiver connected to the processor and configured to:
the transceiver is configured to receive first configuration information from a core network device,
wherein the first configuration information comprises a mapping relationship between relay modes and Relay Service Codes (RSCs) configured by the core network device, the core network device configures, for the first UE, a relay UE and a second UE, the same mapping relationship between the relay modes and the RSCs, the first configuration information further comprises at least one relay mode configured for the first UE by the core network device, and the first UE, the relay UE and the second UE are devices having a Proximity Service (Prose) capability, and
wherein the transceiver is further configured to receive first information broadcasted by the relay UE, wherein the first information indicates at least one second relay mode;
wherein the processor is configured to determine a first relay mode based on the at least one second relay mode and the at least one relay mode configured for the first UE; and perform a communication with the second UE by means of the relay UE based on the first relay mode.

10. The UE of claim 9, wherein the at least one relay mode configured for the first UE comprises at least one of a layer 3-based relay mode or a layer 2-based relay mode.

11. The UE of claim 9, wherein:
the first configuration information is carried in Prose configuration information, or
the first configuration information is carried in UE Route Selection Policy (URSP) configuration information.

12. The UE of claim 9, wherein:
the transceiver is configured to send relay capability information to the core network device, and
the relay capability information comprises one or more relay modes supported by the first UE.

13. The UE of claim 12, wherein the one or more relay modes supported by the first UE comprises at least one of a layer 3-based relay mode or a layer 2-based relay mode.

14. The UE of claim 9, wherein:
the relay UE is a UE providing a relay service, and
the first UE and the second UE are UEs using the relay service.

15. The UE of claim 9, wherein the first information comprises at least one Relay Service Code (RSC) corresponding to the at least one second relay mode.

16. The UE of claim 9, wherein the at least one second relay mode comprises a relay mode common to at least one relay mode configured for the relay UE and at least one relay mode configured for the second UE.

17. A method of wireless communication of a relay User Equipment (UE), comprising:
receiving first configuration information from a core network device,
wherein the first configuration information comprises a mapping relationship between relay modes and Relay Service Codes (RSCs) configured by the core network device, the core network device configures, for a first UE, the relay UE and a second UE, the same mapping relationship between the relay modes and the RSCs, the first configuration information further comprises at least one relay mode configured for the relay UE by the core network device, and the first UE, the relay UE and the second UE are devices having a Proximity Service (Prose) capability;
broadcasting first information to the first UE, wherein the first information indicates at least one second relay mode; and
relaying a communication between the first UE and the second UE based on a first relay mode, wherein the first relay mode is determined by the first UE based on the at least one second relay mode and at least one relay mode configured for the first UE.

18. The method of claim 17, wherein the first information comprises at least one Relay Service Code (RSC) corresponding to the at least one second relay mode.

19. The method of claim 17, wherein the at least one second relay mode comprises a relay mode common to the at least one relay mode configured for the relay UE and at least one relay mode configured for the second UE.

20. A relay User Equipment (UE), comprising:
a processor; and
a transceiver connected to the processor;
wherein the processor and the transceiver are configured to execute the method of claim 17.

* * * * *